US011979939B2

(12) United States Patent
Venkataraman et al.

(10) Patent No.: US 11,979,939 B2
(45) Date of Patent: May 7, 2024

(54) SYSTEMS AND METHODS TO INDICATE EMERGENCY SERVICES SUPPORT FOR ROAMING USERS

(71) Applicant: APPLE INC., Cupertino, CA (US)

(72) Inventors: Vijay Venkataraman, Cupertino, CA (US); Alosious Pradeep Prabhakar, Singapore (SG); Krisztian Kiss, Cupertino, CA (US); Mohammed Sadique, Sydney (AU); Nirlesh Koshta, Karnataka (IN); Rohit R. Matolia, Karnataka (IN); Sirisha Madduri, Cupertino, CA (US); Sridhar Prakasam, Cupertino, CA (US); Srinivasan Nimmala, Cupertino, CA (US); Xiangpeng Jing, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 243 days.

(21) Appl. No.: 17/593,531

(22) PCT Filed: May 19, 2021

(86) PCT No.: PCT/US2021/033132
§ 371 (c)(1),
(2) Date: Nov. 19, 2021

(87) PCT Pub. No.: WO2021/236752
PCT Pub. Date: Nov. 25, 2021

(65) Prior Publication Data
US 2022/0312182 A1 Sep. 29, 2022

(30) Foreign Application Priority Data
May 22, 2020 (IN) .............................. 202041021589

(51) Int. Cl.
H04W 8/12 (2009.01)
H04W 4/90 (2018.01)
(Continued)

(52) U.S. Cl.
CPC ............... H04W 8/12 (2013.01); H04W 4/90 (2018.02); H04W 8/04 (2013.01); H04W 76/50 (2018.02); H04W 84/042 (2013.01)

(58) Field of Classification Search
CPC ....... H04W 48/18; H04W 4/90; H04W 76/50; H04W 48/12; H04W 8/04; H04W 8/12
(Continued)

(56) References Cited

U.S. PATENT DOCUMENTS

2010/0297979 A1    11/2010  Watfa et al.
2016/0345149 A1 *  11/2016  Chuttani ............... H04W 48/18
(Continued)

FOREIGN PATENT DOCUMENTS

WO    2018093948 A1    5/2018
WO    WO2018093948  *  5/2018 ............ H04W 76/50
WO    2019030569 A1    2/2019

OTHER PUBLICATIONS

Draft 3GPP TS 23.501, "3rd Generation Partnership Project; Technical Specification Group Services and System Aspects; System architecture for the 5G System (5GS); Stage 2 (Release 15)", V15.90, May 2020, 249 pages.
(Continued)

Primary Examiner — Maria El-Zoobi
(74) Attorney, Agent, or Firm — Dorsey & Whitney LLP

(57) ABSTRACT

Emergency services support is indicated to roaming devices in a wireless network. A user equipment (UE) may receive a message from the wireless network indicating at least one public land mobile network (PLMN) that provides emergency services support for devices in limited service. The
(Continued)

UE may store, in a non-volatile memory (NVM), an identifier of the at least one PLMN in a whitelist of limited service emergency services support. In response to a trigger in a roaming limited service condition of the UE, the UE may establish an emergency session with a selected PLMN based on the whitelist of limited service emergency services support.

18 Claims, 12 Drawing Sheets

(51) Int. Cl.
    *H04W 8/04*     (2009.01)
    *H04W 76/50*     (2018.01)
    *H04W 84/04*     (2009.01)

(58) Field of Classification Search
    USPC ....................................................... 455/404.1
    See application file for complete search history.

(56) References Cited

U.S. PATENT DOCUMENTS

| | | | |
|---|---|---|---|
| 2019/0053139 A1* | 2/2019 | Basu Mallick | H04W 88/02 |
| 2021/0185523 A1* | 6/2021 | Targali | H04W 12/0471 |

OTHER PUBLICATIONS

PCT/US2021/033132, International Search Report and Written Opinion, dated Sep. 6, 2021, 16 pages.

* cited by examiner

SYSTEMS AND METHODS TO INDICATE EMERGENCY SERVICES SUPPORT FOR ROAMING USERS

TECHNICAL FIELD

This application relates generally to wireless communication systems, and more specifically to emergency services support.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE) (also referred to herein as a mobile device, device, or mobile station (MS)). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Telecommunication services may be offered via Public Land Mobile Networks (PLMNs) to a UE. Functionally, PLMNs may be regarded as independent telecommunications entities even though different PLMNs may be interconnected for forwarding of calls, data (e.g., text messages) or network information. The PLMN infrastructure may be logically divided into Core Network (CN) and Access Network (AN) infrastructures. The CN may be logically divided into a Circuit Switched (CS) domain, a Packet Switched (PS) domain, and an Internet Protocol (IP) Multimedia Subsystem (IMS). The CS domain and PS domain may be overlapping (i.e. they may include at least some common entities). A PLMN may implement only one domain or both domains. A UE may support accessing one or both of the CS domain and PS domain.

The CS domain handles traditional voice calls and emergency calls (also referred to herein as eCalls). The CS domain refers to the set of CN entities or functions offering a CS type of connection for user traffic as well as the entities supporting the related signaling. The PS domain offers PS services including access to the IMS. The PS domain supports emergency services via the IMS. The PS domain refers to the set of CN entities or functions offering a PS type of connection for user traffic as well as the entities supporting the related signaling. A PS type of connection transports user information using an autonomous concatenation of bits called packets, wherein each packet can be routed independently from the previous one. The IMS includes CN elements or functions for provision of IP multimedia services such as audio, video, text, chat, etc., or a combination of such services, delivered over the PS domain.

An emergency call notifies the network that the emergency call is a special type of call and may provide additional information (e.g., in the form of dialed digits or other call parameters) regarding special forms of call treatments such as routing to a particular Public Safety Access Point (PSAP) or providing an estimated geographic location for a calling user to a recipient PSAP.

Voice calls and/or other services may not be allowed when a UE is in a limited service state. However, under certain conditions, emergency calling in a limited service state may be allowed. A UE may be in a limited service state for several reasons. For example, there may not be a valid subscription (e.g., the UE is lacking or has an invalid Subscriber Identity Module (SIM) card) or there may be no roaming agreement between a local network operator and the user's home network operator. An International Mobile Subscriber Identity IMSI is used to authenticate a SIM card (also referred to simply as a "SIM") on a cellular network. The IMSI includes a Mobile Country Code (MCC) that is unique to a particular country, a Mobile Network Code (MNC) that identifies a particular network operator, and an identification (ID) number of the subscriber or Mobile Station Identification Number (MSIN). Thus, when there is no SIM in the UE, the user of the device cannot be authenticated or reliably identified by a wireless network. In some countries, emergency calls are not allowed without use of a SIM and the network operator implements regulatory requirements by rejecting emergency call attempts.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Some roaming networks, also referred to as visited Public Land Mobile Networks (VPLMNs), may not accept emergency requests from or provide emergency services to roaming UE (as identified by IMSI in the SIM) or when the UE is operating without a SIM, or when UE is in limited service.

Some carrier networks implement a practice to only accept emergency calls for devices with a domestic IMSI and reject calls for devices with international roaming IMSI. Some network operators may mandate authentication for roaming users with their partner roamers (e.g., a particular network operator in Japan only allows devices with their roaming partner IMSI for emergency calls). 3GPP does not define any cell parameters to identify such use cases. On a 2G or 3G cell, a mobile device may assume that an emergency call is allowed, which can result in call failure (e.g., with the network limitation described above). On an LTE or 5G cell, information such as IMS emergency support (indicated in system information block1 (SIB1)) and LTE IMS emergency barring (indicated in system information block2 (SIB2)) do not indicate any roaming policies for emergency calls. Thus, the mobile device may have no way to identify which network cell is more preferable for emergency service while roaming.

Further, emergency calls may fail due to on field issues. In an IMS call setup or registration failure, for example, emergency calls can fail due to temporary failure or due to actual network issues (e.g., the network does not allow IMS eCalls). In such cases, the UE may needlessly try to access the CS domain for eCalls when only the PS domain is supported by the network. Also, network configurations in certain locations (e.g., PLMN A having 5G network setup but having emergency calls supported only in 2G and/or 3G) can indicate that IMS emergency calls are not supported and that fallback (UE initiated or network assisted) can be triggered to LTE and then 2G/3G, if needed. In such cases, prior information available at the UE (that is not camped on PLMN A) before initiating camping for eCalls may help in earlier eCall setup time. In certain embodiments, the UE can then select the PLMNs on which CS domain eCalls will likely be successful in a first attempt.

Some PLMNs do not allow emergency calls without SIM. 5G NR and LTE wireless networks may broadcast the following info in SIB1: ims-EmergencySupport, which indicates that the network supports emergency session over IMS; and eCallOverIMS-Support, wherein the UE initiates eCalls over IMS if this bit is set, else the UE initiates emergency calls over the CS domain. Further, 5G NR and LTE network send, in NAS messages (REG or ATTACH or TAU ACCEPT), indication of support for Emergency Bearer Services in S1 or N1. However, the above information provided by the network does not help in solving the issues seen on field described above.

Example Server Update Embodiments

Figure 1:
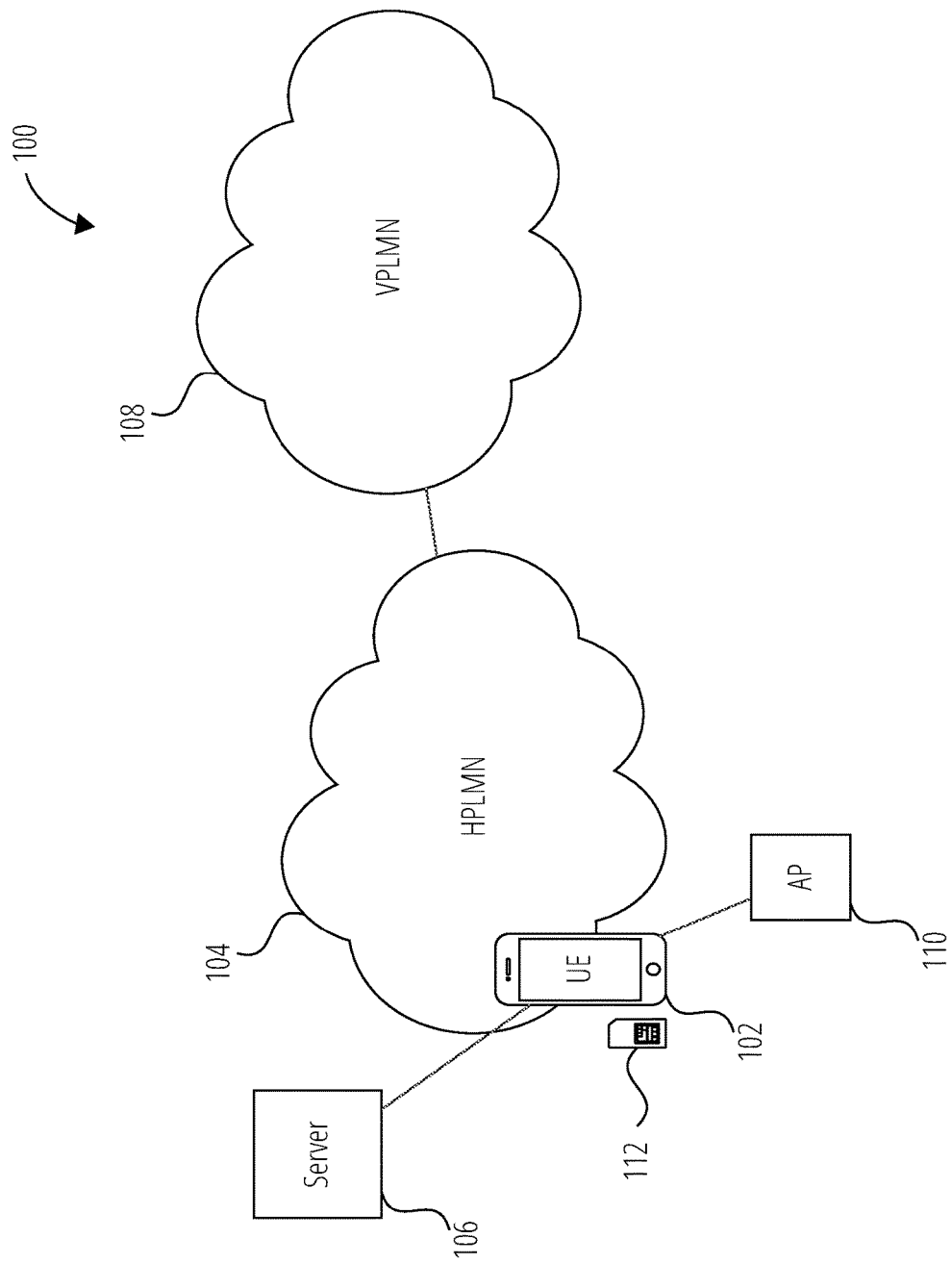
FIG. 1 illustrates a block diagram of a system for indicating emergency service support in accordance with one embodiment.

FIG. 1 illustrates a block diagram of a system 100 for indicating emergency service support according to certain embodiments. The system 100 includes a UE 102, a home Public Land Mobile Network (shown as HPLMN 104), a server 106, and a VPLMN 108. The server 106 may comprise, for example, an entitlement server or an application server. In this embodiment, when the UE 102 is in the HPLMN 104, the UE 102 may query the server 106 to obtain one or more of: a supported PLMN list for limited service emergency calling; and/or a supported PLMN list for roaming user emergency calling support; a supported PLMN list for roaming text to emergency support. The UE 102 may specify a list of countries for which it is requesting this information. The UE 102 may then use the information when in the VPLMN 108.

In certain embodiments, the UE 102 may query the server 106 based on knowledge about UE's intended mobility events (e.g., based on a calendar application executed on the UE), which indicate that the user may soon be traveling to a different country (e.g., within the next week) corresponding to the VPLMN 108. In addition, or in other embodiments, the server 106 may push the information to the UE 102 whenever a supported PLMN list for limited service emergency calling is updated.

The UE 102 may store the supported PLMN list for limited service emergency calling in non-volatile memory (NVM). The UE 102 may use the supported PLMN list for limited service emergency calling for intelligent PLMN selection when roaming in different regions or countries (e.g., to decide whether to attempt to attach or register to the VPLMN 108).

In addition to obtaining the information through the HPLMN 104 from the server 106, or in other embodiments, the UE 102 may obtain the information from the server 106 via a non cellular link or access point (shown as AP 110) (e.g., WiFi® or other wireless local area network (WLAN)).

Example SIM Update Embodiments

In another embodiment, an elementary file (EF) in a SIM card 112 may be configured to indicate emergency support for roaming users. For example, new EF files may be introduced in the SIM card 112 that indicate limited service roaming PLMN emergency calling support for each MCC. In one embodiment, a single EF file may include one or more lists of PLMNs (i.e., whitelists). In other embodiments, multiple EF files may be used. The whitelists may include at least one of a list of PLMNs supporting emergency calls for a UE in limited service with no valid SIM, PLMNs supporting emergency calls for a roaming UE with a roaming agreement and in normal service, PLMNs supporting emergency calls for a roaming UE with a valid SIM but without a roaming agreement, and/or PLMNs supporting emergency text for a roaming UE with a roaming agreement and in normal service. A roaming UE may be in normal service when the roaming UE has a valid SIM and where there is a roaming agreement between the HPLMN and VPLMN. Note that a "UE with a roaming agreement" (or without a roaming agreement) may refer to a roaming agreement between a local network operator and the user's home network operator.

In one embodiment, the list or lists in the EF file in the SIM card 112 may be updated through the AP 110 (e.g., WiFi® or other WLAN) when UE is in a roaming scenario (e.g., visiting the VPLMN 108). The UE 102 may read the EF file from the SIM card 112 to assist with determining which PLMN to choose for the emergency session.

In certain embodiments, the EF file in the SIM card 112 may indicate a preferred PLMN for an emergency session. The preferred PLMN for the emergency session may be based on parameters such as: whether the PLMN provides support for emergency text message; whether the PLMN provides support for emergency callback; and/or whether the PLMN provides support for emergency over LTE.

Figure 2:
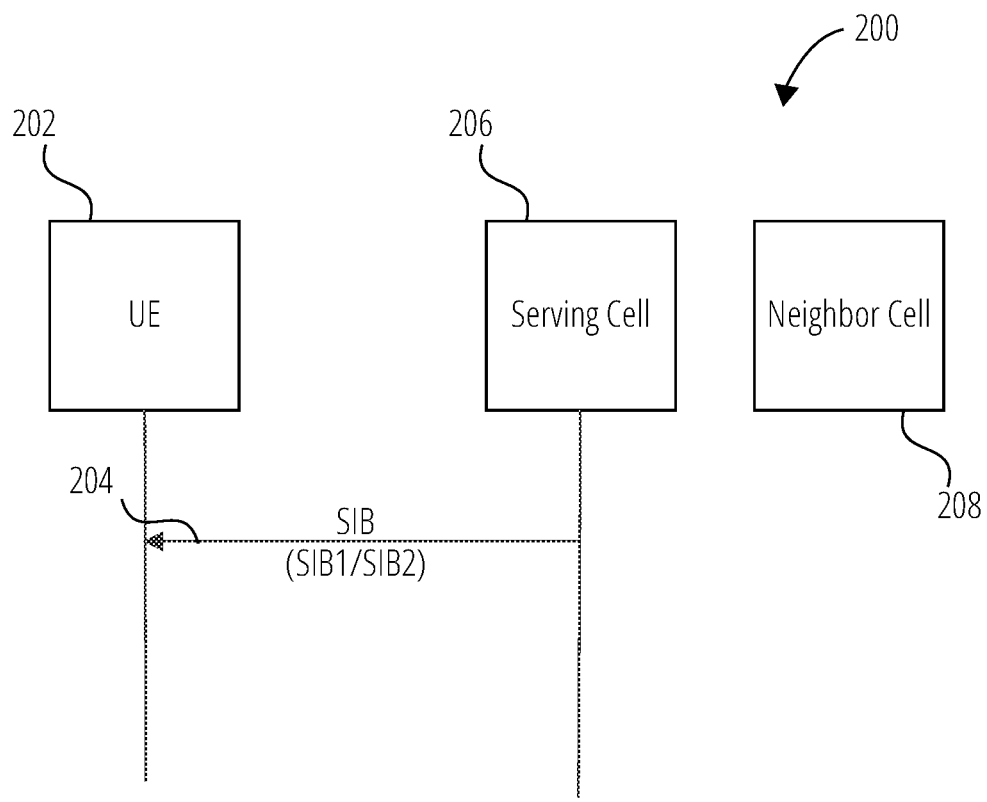
FIG. 2 is a block diagram illustrating a wireless network for using broadcasting to indicate emergency service support in accordance with one embodiment.

Example Embodiment of Broadcasting Serving Cell/Neighbor Cell Support for Emergency Calling FIG. 2 is a block diagram illustrating a wireless network 200 for using broadcasting to indicate emergency service support according to certain embodiments. In the illustrated example, the wireless network 200 indicates the emergency service support to a UE 202 in a SIB 204 from a serving cell 206.

In certain network implementations, the serving cell 206 indicates whether emergency calling is supported in limited service. According to certain embodiments disclosed herein, as part of a neighbor cell configuration, the network may also broadcast whether a neighbor cell 208 supports emergency calling in limited service. The indication helps the UE 202 make a smart decision on which neighbor cell to reselect to (e.g., after receiving a rejection from the serving cell 206 for emergency services).

In addition, or in other embodiments, each of the shared PLMNs broadcasted in the SIB 204 may also indicate whether: emergency calling in limited service is supported; emergency calling is supported for roaming users; and/or emergency text session is supported. Thus, when the UE 202 is in a roaming country, the UE 202 can make an informed decision to move to an appropriate PLMN or cell.

In one embodiment, the network may broadcast one or more additional SIB1 information elements (IEs) for roaming emergency policies (e.g., indicating allowed or disallowed). The roaming device may prefer camping on the cells allowing roaming emergency services to perform an emergency call. Such embodiments may be suitable, for example, for LTE and 5G cells.

The following abstract syntax notation (ASN1) message shows an example LTE SIB1 including an "ims_EmergencySupport_For_Roaming" parameter set to true to indicate to the UE 202 that roaming emergency policies or services are allowed.

```
ASN1_Message -------- ASN1 3GPP 36.331 ----------
value BCCH_DL_SCH_Message ::= {
  message c1 : systemInformationBlockType1 : {
    cellAccessRelatedInfo {
      plmn_IdentityList {
        {
          plmn_Identity {
            mcc {
              4,
              4,
              0
            },
            mnc {
              2,
              0
            }
          }
```
```
          },
          cellReservedForOperatorUse notReserved
        }
      },
      trackingAreaCode '0000000000000001'B,
      cellIdentity '00000000000000000000000000000001'B,
      cellBarred notBarred,
      ... ... ... ... ...
      nonCriticalExtension {
        nonCriticalExtension {
          ims_EmergencySupport_r9 true
          ims_EmergencySupport_For_Roaming true
        }
      }
    }
  }
}
```

In another embodiment, the network may broadcast one or more additional SIB2 IEs for roaming emergency barring policies. A roaming device may select cells for emergency service based on the indicated barring policies. Such embodiments may be suitable, for example, for LTE cells.

The following ASN1 message shows an example LTE SIB2 including an "ac_BarringForEmergencyWhileRoaming" parameter set to true.

```
ASN1_Message -------- ASN1 3GPP 36.331 ----------
value BCCH_DL_SCH_Message ::= {
  message c1 : systemInformation : {
    criticalExtensions systemInformation_r8 : {
      sib_TypeAndInfo {
        sib2 : {
          ac_BarringInfo {
            ac_BarringForEmergency FALSE
              ac_BarringForEmergencyWhileRoaming
            TRUE
          },
          radioResourceConfigCommon {
            rach_ConfigCommon {
              preambleInfo {
                numberOfRA_Preambles n52
              },
              powerRampingParameters {
                powerRampingStep dB2,
                preambleInitialReceivedTarget
              Power dBm_104
              },
              ra_SupervisionInfo {
                preambleTransMax n6,
                ra_ResponseWindowSize
              sf10,
                mac_ContentionResolutionTi
              mer sf48
              },
... ... ... ... ..
```

Example Embodiment of Static PLMN—Limited Service Emergency Calling Support Definition In another embodiment, a predefined static table (similar to SE-13 kind of table controlled by GSMA) may be used to provide a PLMN to limited service emergency calling support mapping. The table may be stored in NVM of UEs (e.g., by the manufacturer of the UEs). The table can be used by the UEs to take appropriate decisions on which PLMNs to camp on, when in a roaming scenario and in limited service.

Example Embodiment of Emergency Calling Support Defined by Operator Policy

In another embodiment, indication of emergency services support for roaming users is controlled by operator policy.

When a home operator negotiates roaming deals, the home operator may come to know operators in certain countries support roaming emergency services. For example, a home operator in India determine that in Japan there are three carriers: Carrier A, Carrier B, and Carrier C. The home operator may also determine, in this example, that Carrier A is a roaming partner but does not support roaming emergency services, and that Carrier C does support roaming emergency services. Thus, the home operator create a list of limited service roaming partners which support emergency services (e.g. Carrier C). The list may be pushed to a UE from a home network or roaming network (e.g., in a Configuration Update Command).

Figure 3:
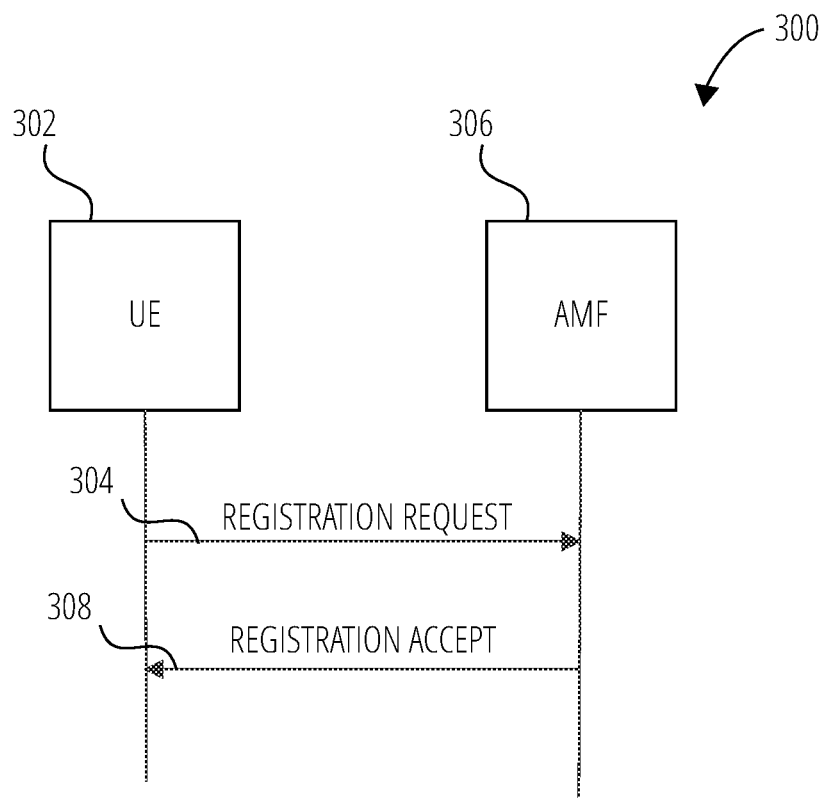
FIG. 3 is a block diagram illustrating a wireless network for indicating emergency service support in accordance with one embodiment.

In another embodiment, the UE may explicitly request the countries for which it wants to use the list. For example, FIG. 3 is a block diagram illustrating a wireless network 300 for indicating emergency service support according to certain embodiments. In this example, a UE 302 sends the request as part of a registration request 304 message (e.g., specifying new IE MCC=China/India) to an access and mobility management function (AMF) (shown as AMF 306). The UE 302 may then get a response back from the AMF 306 in a registration accept 308 message listing out the PLMNs which support emergency calling in a roaming scenario. This may be done in the home and/or roaming network. The UE 302 may then store the list in NVM and use the list during a roaming limited service scenario. In addition, or in other embodiments, the UE 302 may request and receive information corresponding to other lists of PLMNs (i.e., whitelists) including one or more of a list of PLMNs supporting emergency calls for a UE in limited service with no valid SIM, PLMNs supporting emergency calls for a roaming UE with a roaming agreement and in normal service, PLMNs supporting emergency calls for a roaming UE with a valid SIM but without a roaming agreement, and/or PLMNs supporting emergency text for a roaming UE with a roaming agreement and in normal service. A roaming UE may be in normal service when the roaming UE has a valid SIM and where there is a roaming agreement between the HPLMN and VPLMN.

Example Embodiment of Steering of Emergency Roaming

In another embodiment, indication of emergency services support for roaming users is provided to a UE through a VPLMN from a HPLMN. Certain network implementations use Steering of Roaming (SOR) procedures in which a roaming network (i.e., an AMF in a VPLMN, also referred to herein as a visited AMF or V-AMF), contacts the home network (i.e., a unified data management (UDM) entity in a HPLMN, also referred to herein as an HPLMN-UDM or H-UDM) during a registration procedure. The home network then provides a secured container that is transparently forwarded to the UE by the VPLMN in a registration accept message.

Certain embodiments herein modify the SOR procedures such that the H-UDM additionally provides a list of VPLMNs that support limited service emergency calls in the secured container and/or other lists described herein. Furthermore, the H-UDM may also provide information about the VPLMNs that support text to emergency support. This information is used by the UE for intelligent system selection when the user is about to initiate an emergency session (e.g., select an appropriate PLMN for voice vs. text).

Figure 4:
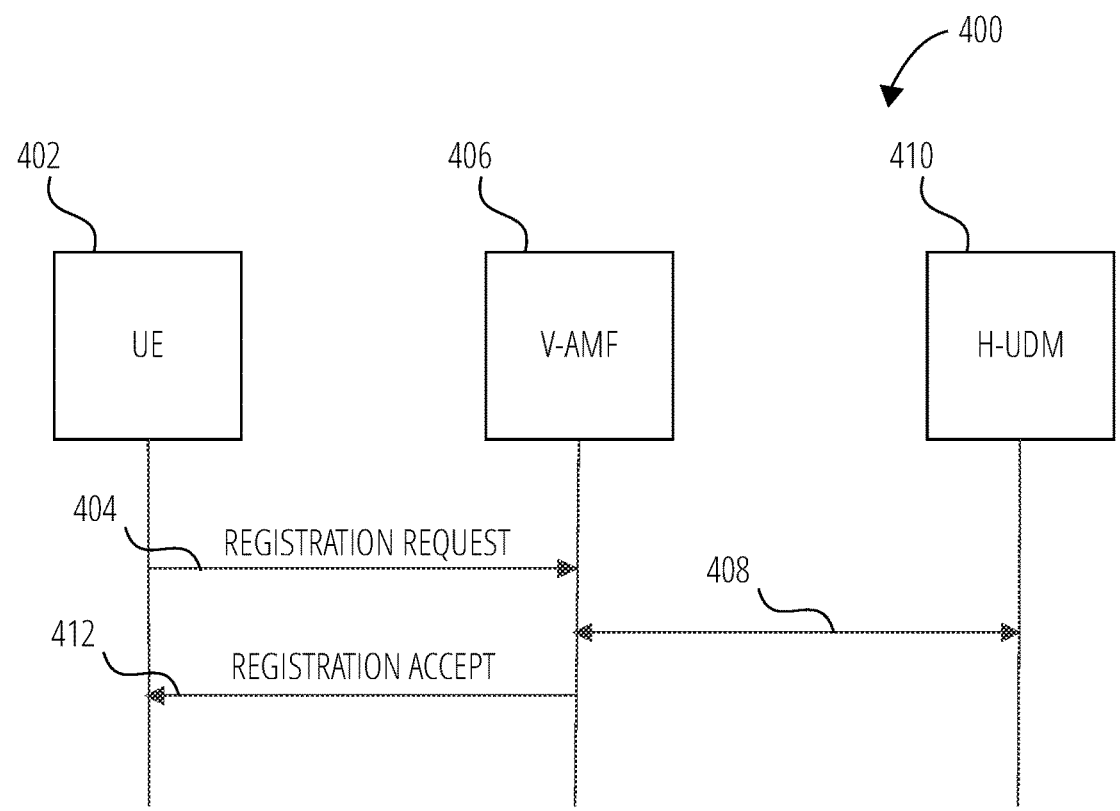
FIG. 4 is a block diagram illustrating a wireless network for indicating emergency service support in accordance with one embodiment.

For example, FIG. 4 is a block diagram illustrating a wireless network 400 for indicating emergency service support according to certain embodiments. While roaming, a UE 402 sends a registration request 404 message to a V-AMF 406) in a VPLMN. The V-AMF 406 has an exchange 408 with the UE's HPLMN wherein the V-AMF 406 contacts an H-UDM 410 during the registration procedure and the H-UDM 410 responds with a secured container comprising a list of VPLMNs that support limited service emergency calls and/or other lists described herein. The H-UDM 410 may also provide, in the secured container, information about the VPLMNs that support text to emergency support. The V-AMF 406 then transparently forwards the secured container to the UE 402 in a registration accept 412 message. The UE 402 then uses the information in the registration accept 412 to choose a VPLMN for emergency services.

Example Embodiment of Dynamic Update of Preferred PLMN and RAT Information for Emergency Calls Using Crowd Sourcing In another embodiment, server (such as the server 106 shown in FIG. 1), or an element or function in a core network, may use crowd sourcing to create and/or update a table of preferred PLMN and/or RAT information to use for emergency services. The table may be provided or updated to all UEs whenever system or user information is updated by the server.

The server may track which PLMNs allow UEs to initiate emergency calls or other emergency services without a SIM. The server maintains and updates tables with success percentages based on HPLMNs and VPLMNs where UEs were able to initiate emergency calls successfully. The server may also maintain information on which countries allow domestic UEs only for emergency calls.

The server may update this information periodically to UEs, for example, by pushing new information or updated tables to the UEs. The server and UE may use an inexpensive link such as WiFi® to get this information. In addition, or in other embodiments, the server may only send a subset of the preferred PLMN and RAT information for emergency calls to a devices based on a currently camped country and neighboring countries.

By way of example, Table A and Table B show the information that may be collected by the server and provided to the UEs.

TABLE A

| MCC(s) for each Country | Emergency VPLMNs in priority order for a specific country (successful attempts/attempts) | RATs in priority order | With or without SIM | IMS Ecall supported | IMS Emergency supported |
| --- | --- | --- | --- | --- | --- |
| 262 | 262-03: (28/35) | 5G (10/15), LTE (8/10), UMTS (10/10) | With SIM | 8/35 | 18/35 |

TABLE A-continued

| MCC(s) for each Country | Emergency VPLMNs in priority order for a specific country (successful attempts/attempts) | RATs in priority order | With or without SIM | IMS Ecall supported | IMS Emergency supported |
|---|---|---|---|---|---|
| | 262-03: (26/32) | 5G (8/12), LTE (10/11), UMTS (8/9) | Without SIM | 10/32 | 18/32 |
| | 262-01: (10/30) | 5G (3/15), LTE (2/10), UMTS (5/10) | With SIM | 8/30 | 18/30 |
| | 262-01: (0/10) | 5G (0/4), LTE (0/6 | Without SIM | 0/10 | 0/10 |
| 310 | 310-410: (20/40) | 5G (8/8), LTE (8/12), UMTS (4/4) | With SIM | 24/24 | 24/24 |

Table A shows success rates for emergency calls on PLMNs across a region or the world. For example, in a country with MCC=262, for a VPLMN with an MNC=03 (VPLMN identified by 262-03), for UEs with a SIM card, 28 successful attempts were made out of 35 total attempts. As shown in the corresponding row of Table A, 10 out of 15 attempts were successful on a 5G RAT, 8 out of 10 attempts were successful on an LTE RAT, and 10 out of 10 attempts were successful on a UMTS RAT. Further, 8 out of 15 IMS Ecalls were supported and 18 out of 35 IMS Emergency service were supported.

TABLE B

| EHPLMNs | VPLMNs where UE is able to receive service and emergency calls were successful |
|---|---|
| 310-410 | 440-00, 440-01 |
| 310-210 | 440-01, 440-03, 440-04 |
| 262-01 | 440-02, 4400-03 |
| 262-02 | 440-01 |

Table B shows relationships between equivalent HPLMNs (EHPLMNs) and roaming VPLMNs. For example, for an EHPLMN identified by MCC-MNC 310-410, one or more UEs were able to receive service and emergency calls were successful on VPLMNs identified by 440-00 and 440-01.

A UE may use the information in Table A and/or Table B to choose a VPLMN and/or RAT type when attempting to access emergency services. Thus, the UE can reduce the number or likelihood of failed attempts.

Example Methods

Figure 5:
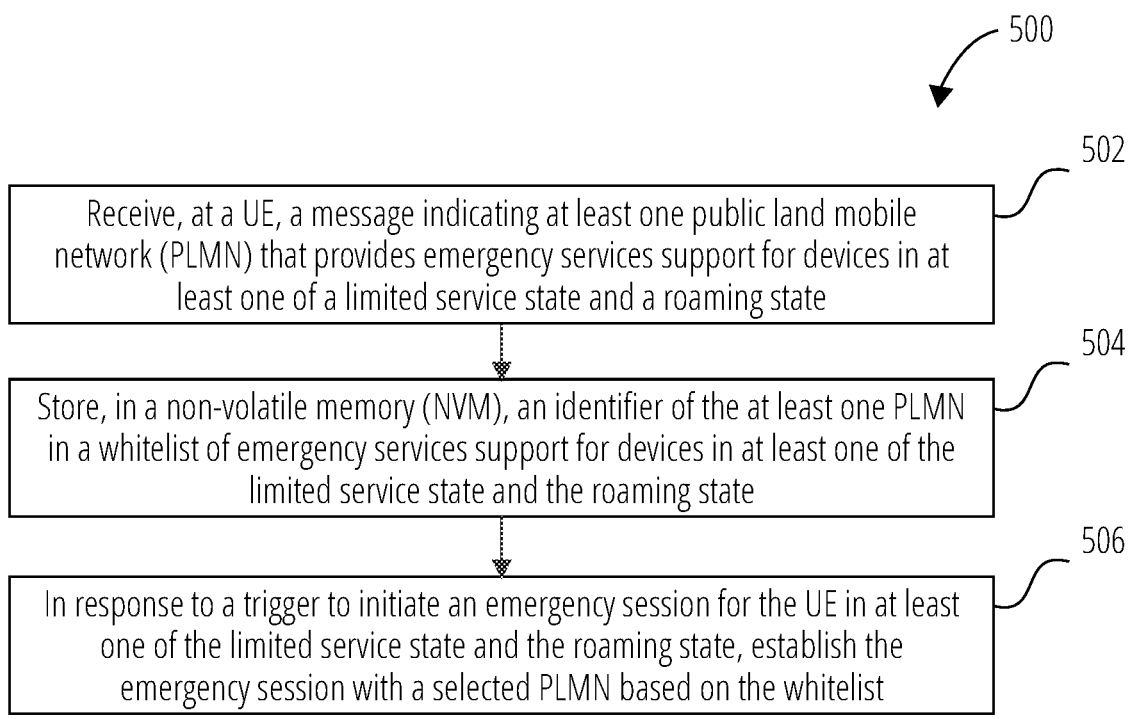
FIG. 5 is a flowchart illustrating a method for a UE in accordance with one embodiment.

FIG. 5 is a flowchart illustrating a method 500 for a UE according to certain embodiments. In block 502, the method 500 includes receiving, at the UE, a message indicating at least one public land mobile network (PLMN) that provides emergency services support for devices in at least one of a limited service state and a roaming state. In block 504, the method 500 includes storing, in a non-volatile memory (NVM), an identifier of the at least one PLMN in a whitelist of emergency services support for devices in at least one of the limited service state and the roaming state. In block 506, in response to a trigger to initiate an emergency session for the UE in at least one of the limited service state and the roaming state, establishing the emergency session with a selected PLMN based on the whitelist. The trigger may include, for example, a user dialing an emergency number or otherwise attempting to access emergency services using the UE.

In certain embodiments, storing the identifier in the NVM comprises updating an elementary file (EF) in a subscriber identity module (SIM) card to indicate that the at least one PLMN corresponding to a mobile country code (MCC) supports at least one of emergency calls for devices in limited service with no valid SIM, emergency calls for roaming devices with a roaming agreement and in normal service, emergency calls for roaming devices with a valid SIM but without a roaming agreement, and emergency text for roaming devices with a roaming agreement and in normal service. The EF in the SIM card may indicate a preferred PLMN for emergency sessions. Further, the preferred PLMN for emergency sessions may be prioritized based on one or more parameters selected from a group comprising support for emergency text messages, support for emergency callback, and support for emergency session over a particular radio access technology (RAT) type.

In certain embodiments, the message comprises a system information block (SIB) broadcast from a serving cell. The SIB may indicate whether at least one of the serving cell and a neighbor cell supports at least one of emergency calls for devices in limited service with no valid SIM, emergency calls for roaming devices with a roaming agreement and in normal service, emergency calls for roaming devices with a valid SIM but without a roaming agreement, and emergency text for roaming devices with a roaming agreement and in normal service, wherein the serving cell corresponds to a first PLMN and the neighbor cell corresponds to the first or a second PLMN. For each of a plurality of PLMN identifiers listed in a PLMN identity list indicated in the SIB, the method 500 may further include determining whether support is provided for at least one of emergency calling in limited service, emergency calling for roaming users, and emergency text sessions. The SIB may comprise a first SIB (SIB1) including an information element (IE) configured to indicate whether a roaming emergency policy is allowed or disallowed. Or, the SIB may comprise a second SIB (SIB2) including an information element (IE) indicating a roaming emergency barring policy.

In certain embodiments, the message comprises a list of roaming partners that provide support for at least one of emergency calls for devices in limited service with no valid SIM, emergency calls for roaming devices with a roaming agreement and in normal service, emergency calls for roaming devices with a valid SIM but without a roaming agreement, and emergency text for roaming devices with a roaming agreement and in normal service. The method 500 may further include receiving the message comprising the list of roaming partners from a wireless network in a configuration update command. In addition, or in other embodiments, the method 500 may further include: sending a registration request to a home public land mobile network (HPLMN), the registration request indicating one or more countries or regions for which the UE requests the list of roaming partners; and in response to the registration request, receiving a registration accept message from the HPLMN comprising the list of roaming partners.

In certain embodiments, the message comprises a secured container from a home public land mobile network (HPLMN) forwarded by a visited public land mobile network (VPLMN) in a registration accept message or a registration reject message. The message may include, for example, a list of VPLMNs that provide support for at least one of emergency calls for devices in limited service with no valid SIM, emergency calls for roaming devices with a roaming agreement and in normal service, emergency calls for roaming devices with a valid SIM but without a roaming agreement, and emergency text for roaming devices with a roaming agreement and in normal service.

In certain embodiments, the message is received from an entitlement server or application server.

In certain embodiments, the message comprises a table indicating success rates of a plurality of roaming UEs that attempted emergency services per visited public land mobile network (VPLMN). The table may include additional information selected from a group comprising a relation between home public land mobile networks (HPLMNs) and VPLMNs, a prioritized list of radio access technology (RAT) types, and success rates based on attempts made by UEs with or without subscriber identity module (SIM) cards.

In certain embodiments, the message is received from a base station of a home public land mobile network (HPLMN) when the UE is in a non-roaming scenario.

In certain embodiments, the message is received from an access point of a wireless local area network (WLAN) when the UE is in a roaming scenario.

In certain embodiments, apparatus comprising means to perform the method 500.

In certain embodiments, machine-readable storage including machine-readable instructions, that when executed, implements the method 500.

Figure 6:
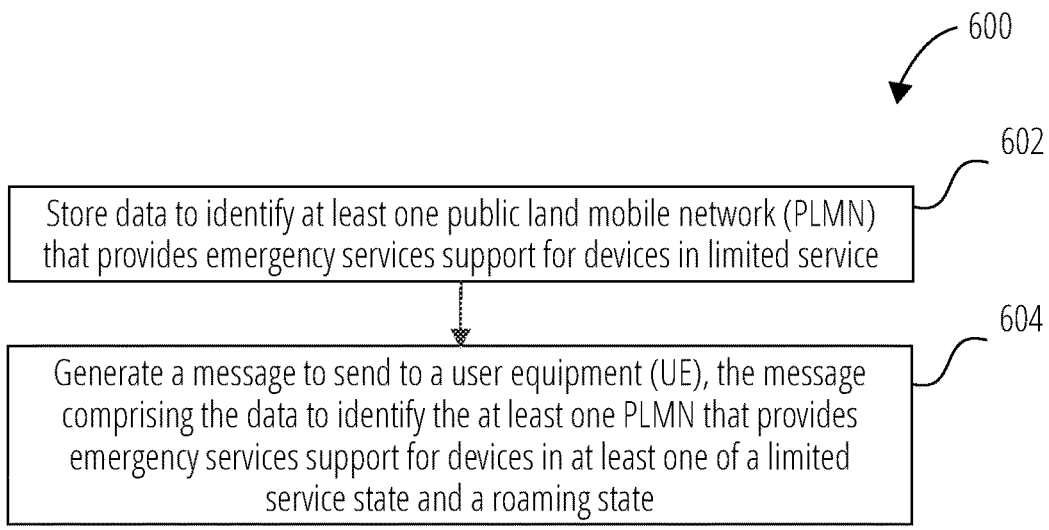
FIG. 6 is a flowchart illustrating a method for a network element in a wireless communication system in accordance with one embodiment.

FIG. 6 is a flowchart illustrating a method 600 for a network element in a wireless communication system according to certain embodiments. In block 602, method 600 includes storing data to identify at least one public land mobile network (PLMN) that provides emergency services support for devices in limited service. In block 604, method 600 includes generating a message to send to a user equipment (UE), the message comprising the data to identify the at least one PLMN that provides emergency services support for devices in at least one of a limited service state and a roaming state.

In certain embodiments, the message is configured to update an elementary file (EF) in a subscriber identity module (SIM) card to indicate that the at least one PLMN corresponding to a mobile country code (MCC) supports at least one of emergency calls for devices in limited service with no valid SIM, emergency calls for roaming devices with a roaming agreement and in normal service, emergency calls for roaming devices with a valid SIM but without a roaming agreement, and emergency text for roaming devices with a roaming agreement and in normal service. The data may indicate a preferred PLMN for emergency sessions, wherein the preferred PLMN for emergency sessions is prioritized based on one or more parameters selected from a group comprising support for emergency text messages, support for emergency callback, and support for emergency session over a particular radio access technology (RAT) type.

In certain embodiments, the message comprises a system information block (SIB) broadcast to transmit from a serving cell to the UE, and the data indicates whether support is provided for at least one of emergency calls for devices in limited service with no valid SIM, emergency calls for roaming devices with a roaming agreement and in normal service, emergency calls for roaming devices with a valid SIM but without a roaming agreement, and emergency text for roaming devices with a roaming agreement and in normal service. The SIB may indicate whether at least one of the serving cell and a neighbor cell supports emergency calling in limited service, wherein the serving cell corresponds to a first PLMN and the neighbor cell corresponds to the first PLMN or a second PLMN. In certain such embodiments, the SIB comprises a first SIB (SIB1) including a first information element (IE) configured to indicate whether a roaming emergency policy is allowed or disallowed, or a second SIB (SIB2) including a second IE to indicate a roaming emergency barring policy.

In certain embodiments, the message comprises a list of limited service roaming partners that provide the emergency services support for devices in at least one of the limited service state and the roaming state. To generate the message may comprise including the data in a configuration update command for the UE. Or, in another embodiment, to generate the message may comprise, in response to a registration request from the UE, generating a registration accept message including the data.

In certain embodiments, the network element comprises a unified data management (UDM) function in a home public land mobile network (HPLMN) of the UE, and the method 600 further comprises: in response to a request from a visited access and mobility management function (V-AMF), generating a secured container comprising the data; and sending the secured container to the V-AMF. The message may comprise a list of visited public land mobile networks (VPLMNs) that provide support for at least one of emergency calls for devices in limited service with no valid SIM, emergency calls for roaming devices with a roaming agreement and in normal service, emergency calls for roaming devices with a valid SIM but without a roaming agreement, and emergency text for roaming devices with a roaming agreement and in normal service.

In certain embodiments, the network element comprises an entitlement server or an application server.

In certain embodiments, the method 600 further comprises: tracking attempts by a plurality of UEs in limited service to initiate emergency services on a plurality of visited public land mobile networks (VPLMNs); updating one or more tables to indicate success rates of the plurality of UEs to initiate the emergency services; and including the table in the message to send to the UE. The table may include additional information selected from a group comprising a relation between home public land mobile networks (HPLMNs) and VPLMNs, a prioritized list of radio access technology (RAT) types, and success rates based on attempts made by UEs with or without subscriber identity module (SIM) cards.

Example Systems and Apparatus

Figure 7:
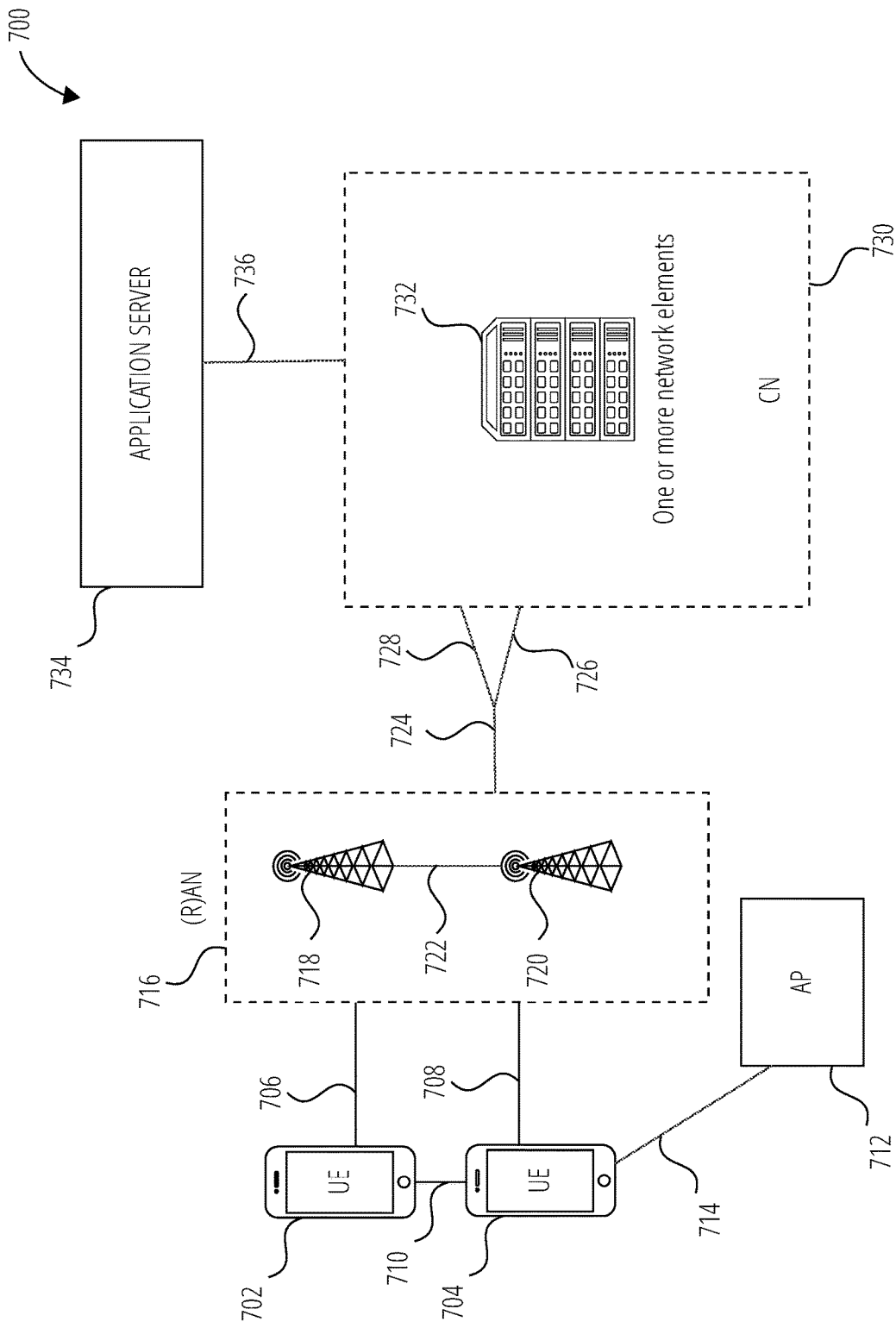
FIG. 7 illustrates a system in accordance with one embodiment.

FIG. 7 illustrates an example architecture of a system 700 of a network, in accordance with various embodiments. The following description is provided for an example system 700 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 7, the system 700 includes UE 702 and UE 704. In this example, the UE 702 and the UE 704 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, the UE 702 and/or the UE 704 may be IoT UEs, which may comprise a network access layer designed for low power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 702 and UE 704 may be configured to connect, for example, communicatively couple, with an access node or radio access node (shown as (R)AN 716). In embodiments, the (R)AN 716 may be an NG RAN or a SG RAN, an E-UTRAN, or a legacy RAN, such as a UTRAN or GERAN. As used herein, the term "NG RAN" or the like may refer to a (R)AN 716 that operates in an NR or SG system, and the term "E-UTRAN" or the like may refer to a (R)AN 716 that operates in an LTE or 4G system. The UE 702 and UE 704 utilize connections (or channels) (shown as connection 706 and connection 708, respectively), each of which comprises a physical communications interface or layer (discussed in further detail below).

In this example, the connection 706 and connection 708 are air interfaces to enable communicative coupling, and can be consistent with cellular communications protocols, such as a GSM protocol, a CDMA network protocol, a PTT protocol, a POC protocol, a UMTS protocol, a 3GPP LTE protocol, a SG protocol, a NR protocol, and/or any of the other communications protocols discussed herein. In embodiments, the UE 702 and UE 704 may directly exchange communication data via a ProSe interface 710. The ProSe interface 710 may alternatively be referred to as a sidelink (SL) interface 110 and may comprise one or more logical channels, including but not limited to a PSCCH, a PSSCH, a PSDCH, and a PSBCH.

The UE 704 is shown to be configured to access an AP 712 (also referred to as "WLAN node," "WLAN," "WLAN Termination," "WT" or the like) via connection 714. The connection 714 can comprise a local wireless connection, such as a connection consistent with any IEEE 802.11 protocol, wherein the AP 712 would comprise a wireless fidelity (Wi-Fi®) router. In this example, the AP 712 may be connected to the Internet without connecting to the core network of the wireless system (described in further detail below). In various embodiments, the UE 704, (R)AN 716, and AP 712 may be configured to utilize LWA operation and/or LWIP operation. The LWA operation may involve the UE 704 in RRC_CONNECTED being configured by the RAN node 718 or the RAN node 720 to utilize radio resources of LTE and WLAN. LWIP operation may involve the UE 704 using WLAN radio resources (e.g., connection 714) via IPsec protocol tunneling to authenticate and encrypt packets (e.g., IP packets) sent over the connection 714. IPsec tunneling may include encapsulating the entirety of original IP packets and adding a new packet header, thereby protecting the original header of the IP packets.

The (R)AN 716 can include one or more AN nodes, such as RAN node 718 and RAN node 720, that enable the connection 706 and connection 708. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node that operates in an NR or SG system (for example, a gNB), and the term "E-UTRAN node" or the like may refer to a RAN node that operates in an LTE or 4G system 700 (e.g., an eNB). According to various embodiments, the RAN node 718 or RAN node 720 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN node 718 or RAN node 720 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes (e.g., RAN node 718 or RAN node 720); a MAC/PHY split wherein RRC, PDCP, RLC, and MAC layers are operated by the CRAN/vBBUP and the PHY layer is operated by individual RAN nodes (e.g., RAN node 718 or RAN node 720); or a "lower PHY" split wherein RRC, PDCP, RLC, MAC layers and upper portions of the PHY layer are operated by the CRAN/vBBUP and lower portions of the PHY layer are operated by individual RAN nodes. This virtualized framework allows the freed-up processor cores of the RAN node 718 or RAN node 720 to perform other virtualized applications. In some implementations, an individual RAN node may represent individual gNB-DUs that are connected to a gNB-CU via individual F1 interfaces (not shown by FIG. 7).

In these implementations, the gNB-DUs may include one or more remote radio heads or RFEMs, and the gNB-CU may be operated by a server that is located in the (R)AN 716 (not shown) or by a server pool in a similar manner as the CRAN/vBBUP. Additionally, or alternatively, one or more of the RAN node 718 or RAN node 720 may be next generation eNBs (ng-eNBs), which are RAN nodes that provide E-UTRA user plane and control plane protocol terminations toward the UE 702 and UE 704, and are connected to an SGC via an NG interface (discussed infra). In V2X scenarios one or more of the RAN node 718 or RAN node 720 may be or act as RSUs.

The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally, or alternatively, the RSU may operate on the cellular V2X band to provide the aforementioned low latency communications, as well as other cellular communications services. Additionally, or alternatively, the RSU may operate as a Wi-Fi hotspot (2.4 GHz band) and/or provide connectivity to one or more cellular networks to provide uplink and downlink communication. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or a backhaul network.

The RAN node 718 and/or the RAN node 720 can terminate the air interface protocol and can be the first point of contact for the UE 702 and UE 704. In some embodiments, the RAN node 718 and/or the RAN node 720 can fulfill various logical functions for the (R)AN 716 including, but not limited to, radio network controller (RNC) functions such as radio bearer management, uplink and downlink dynamic radio resource management and data packet scheduling, and mobility management.

In embodiments, the UE 702 and UE 704 can be configured to communicate using OFDM communication signals with each other or with the RAN node 718 and/or the RAN node 720 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from the RAN node 718 and/or the RAN node 720 to the UE 702 and UE 704, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UE 702 and UE 704 and the RAN node 718 and/or the RAN node 720 communicate data (for example, transmit and receive) over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UE 702 and UE 704 and the RAN node 718 or RAN node 720 may operate using LAA, eLAA, and/or feLAA mechanisms. In these implementations, the UE 702 and UE 704 and the RAN node 718 or RAN node 720 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UE 702 and UE 704, RAN node 718 or RAN node 720, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA Here, when a WLAN node (e.g., a mobile station (MS) such as UE 702, AP 712, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (µs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 702 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UE 702 and UE 704. The PDCCH carries information about the transport format and resource allocations related to the PDSCH channel, among other things. It may also inform the UE 702 and UE 704 about the transport format, resource allocation, and HARQ information related to the uplink shared channel. Typically, downlink scheduling (assigning control and shared channel resource blocks to the UE 704 within a cell) may be performed at any of the RAN node 718 or RAN node 720 based on channel quality information fed back from any of the UE 702 and UE 704. The downlink resource assignment information may be sent on the PDCCH used for (e.g., assigned to) each of the UE 702 and UE 704.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition.

There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN node 718 or RAN node 720 may be configured to communicate with one another via interface 722. In embodiments where the system 700 is an LTE system (e.g., when CN 730 is an EPC), the interface 722 may be an X2 interface. The X2 interface may be defined between two or more RAN nodes (e.g., two or more eNBs and the like) that connect to an EPC, and/or between two eNBs connecting to the EPC. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 702 from an SeNB for user data; information of PDCP PDUs that were not delivered to a UE 702; information about a current minimum desired buffer size at the Se NB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 700 is a 5G or NR system (e.g., when CN 730 is an 5GC), the interface 722 may be an Xn interface. The Xn interface is defined between two or more RAN nodes (e.g., two or more gNBs and the like) that connect to 5GC, between a RAN node 718 (e.g., a gNB) connecting to 5GC and an eNB, and/or between two eNBs connecting to 5GC (e.g., CN 730). In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 702 in a connected mode (e.g., CM-CONNECTED) including functionality to manage the UE mobility for connected mode between one or more RAN node 718 or RAN node 720. The mobility support may include context transfer from an old (source) serving RAN node 718 to new (target) serving RAN node 720; and control of user plane tunnels between old (source) serving RAN node 718 to new (target) serving RAN node 720. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The (R)AN 716 is shown to be communicatively coupled to a core network-in this embodiment, CN 730. The CN 730 may comprise one or more network elements 732, which are configured to offer various data and telecommunications services to customers/subscribers (e.g., users of UE 702 and UE 704) who are connected to the CN 730 via the (R)AN 716. The components of the CN 730 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 730 may be referred to as a network slice, and a logical instantiation of a portion of the CN 730 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, an application server 734 may be an element offering applications that use IP bearer resources with the core network (e.g., UMTS PS domain, LTE PS data services, etc.). The application server 734 can also be configured to support one or more communication services (e.g., VoIP sessions, PTT sessions, group communication sessions, social networking services, etc.) for the UE 702 and UE 704 via the EPC. The application server 734 may communicate with the CN 730 through an IP communications interface 736.

In embodiments, the CN 730 may be an SGC, and the (R)AN 116 may be connected with the CN 730 via an NG interface 724. In embodiments, the NG interface 724 may be split into two parts, an NG user plane (NG-U) interface 726, which carries traffic data between the RAN node 718 or RAN node 720 and a UPF, and the S1 control plane (NG-C) interface 728, which is a signaling interface between the RAN node 718 or RAN node 720 and AMFs.

In embodiments, the CN 730 may be a SG CN, while in other embodiments, the CN 730 may be an EPC). Where CN 730 is an EPC, the (R)AN 116 may be connected with the CN 730 via an S1 interface 724. In embodiments, the S1 interface 724 may be split into two parts, an S1 user plane (S1-U) interface 726, which carries traffic data between the RAN node 718 or RAN node 720 and the S-GW, and the S1-MME interface 728, which is a signaling interface between the RAN node 718 or RAN node 720 and MMEs.

In certain embodiments, 5G System architecture supports data connectivity and services enabling deployments to use techniques such as Network Function Virtualization and Software Defined Networking. The 5G System architecture may leverage service-based interactions between Control Plane Network Functions. Separating User Plane functions from the Control Plane functions allows independent scalability, evolution, and flexible deployments (e.g., centralized location or distributed (remote) location). Modularized function design allows for function re-use and may enable flexible and efficient network slicing. A Network Function and its Network Function Services may interact with another NF and its Network Function Services directly or indirectly via a Service Communication Proxy. Another intermediate function may help route Control Plane messages. The architecture minimizes dependencies between the AN and the CN. The architecture may include a converged core network with a common AN-CN interface that integrates different Access Types (e.g., 3GPP access and non-3GPP access). The architecture may also support a unified authentication framework, stateless NFs where the compute resource is decoupled from the storage resource, capability exposure, concurrent access to local and centralized services (to support low latency services and access to local data networks, User Plane functions can be deployed close to the AN), and/or roaming with both Home routed traffic as well as Local breakout traffic in the visited PLMN.

The 5G architecture may be defined as service-based and the interaction between network functions may include a service-based representation, where network functions (e.g., AMF) within the Control Plane enable other authorized network functions to access their services. The service-based representation may also include point-to-point reference points. A reference point representation may also be used to show the interactions between the NF services in the network functions described by point-to-point reference point (e.g., N11) between any two network functions (e.g., AMF and SMF).

Figure 8:
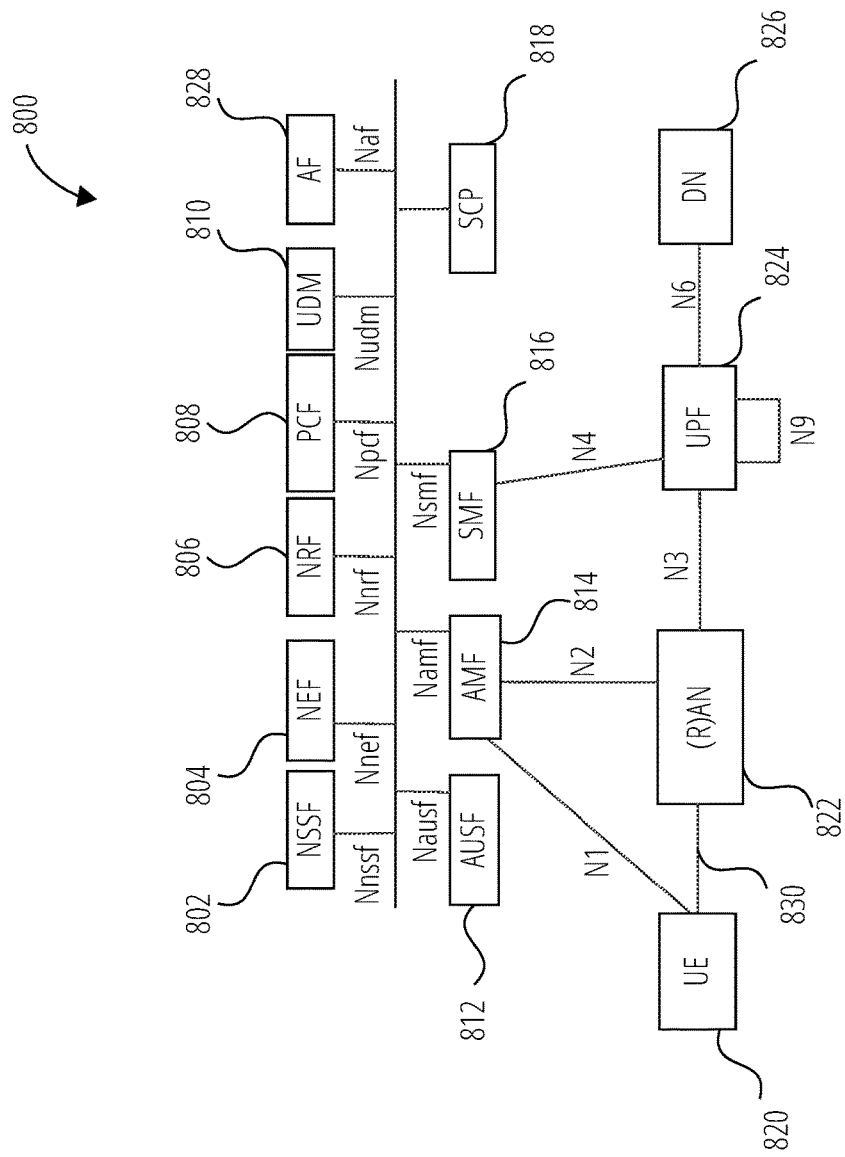
FIG. 8 illustrates an example service based architecture in accordance with certain embodiments.

FIG. 8 illustrates a service based architecture 800 in 5GS according to one embodiment. As described in 3GPP TS 23.501, the service based architecture 800 comprises NFs such as an NSSF 802, a NEF 804, an NRF 806, a PCF 808, a UDM 810, an AUSF 812, an AMF 814, an SMF 816, for communication with a UE 820, a (R)AN 822, a UPF 824, and a DN 826. The NFs and NF services can communicate directly, referred to as Direct Communication, or indirectly via a SCP 818, referred to as Indirect Communication. FIG. 8 also shows corresponding service-based interfaces including Nutm, Naf, Nudm, Npcf, Nsmf, Nnrf, Namf, Nnef, Nnssf, and Nausf, as well as reference points N1, N2, N3, N4, and N6. A few example functions provided by the NFs shown in FIG. 8 are described below.

The NSSF 802 supports functionality such as: selecting the set of Network Slice instances serving the UE; determining the Allowed NSSAI and, if needed, mapping to the Subscribed S-NSSAIs; determining the Configured NSSAI and, if needed, the mapping to the Subscribed S-NSSAIs; and/or determining the AMF Set to be used to serve the UE, or, based on configuration, a list of candidate AMF(s), possibly by querying the NRF.

The NEF 804 supports exposure of capabilities and events. NF capabilities and events may be securely exposed by the NEF 804 (e.g., for 3rd party, Application Functions, and/or Edge Computing). The NEF 804 may store/retrieve information as structured data using a standardized interface (Nudr) to a UDR. The NEF 804 may also secure provision of information from an external application to 3GPP network and may provide for the Application Functions to securely provide information to the 3GPP network (e.g., expected UE behavior, 5GLAN group information, and service specific information), wherein the NEF 804 may authenticate and authorize and assist in throttling the Application Functions (AFs). The NEF 804 may provide translation of internal-external information by translating between information exchanged with an AF 828 and information exchanged with the internal network function. For example, the NEF 804 translates between an AF-Service-Identifier and internal 5G Core information such as DNN and S-NS-SAI. The NEF 804 may handle masking of network and user sensitive information to external AF's according to the network policy. The NEF 804 may receive information from other network functions (based on exposed capabilities of other network functions), and stores the received information as structured data using a standardized interface to a UDR. The stored information can be accessed and re-exposed by the NEF 804 to other network functions and Application Functions, and used for other purposes such as analytics. For external exposure of services related to specific UE(s), the NEF 804 may reside in the HPLMN. Depending on operator agreements, the NEF 804 in the HPLMN may have interface(s) with NF(s) in the VPLMN. When a UE is capable of switching between EPC and 5GC, an SCEF+NEF may be used for service exposure.

The NRF 806 supports service discovery function by receiving an NF Discovery Request from an NF instance or SCP and providing the information of the discovered NF instances to the NF instance or SCP. The NRF 806 may also support P-CSCF discovery (specialized case of AF discovery by SMF), maintains the NF profile of available NF instances and their supported services, and/or notify about newly registered/updated/deregistered NF instances along with its NF services to the subscribed NF service consumer or SCP. In the context of Network Slicing, based on network implementation, multiple NRFs can be deployed at different levels such as a PLMN level (the NRF is configured with information for the whole PLMN), a shared-slice level (the NRF is configured with information belonging to a set of Network Slices), and/or a slice-specific level (the NRF is configured with information belonging to an S-NSSAI). In the context of roaming, multiple NRFs may be deployed in the different networks, wherein the NRF(s) in the Visited PLMN (known as the vNRF) are configured with information for the visited PLMN, and wherein the NRF(s) in the Home PLMN (known as the hNRF) are configured with information for the home PLMN, referenced by the vNRF via an N27 interface.

The PCF 808 supports a unified policy framework to govern network behavior. The PCF 808 provides policy rules to Control Plane function(s) to enforce them. The PCF 808 accesses subscription information relevant for policy decisions in a Unified Data Repository (UDR). The PCF 808 may access the UDR located in the same PLMN as the PCF.

The UDM 810 supports generation of 3GPP AKA Authentication Credentials, User Identification Handling (e.g., storage and management of SUPI for each subscriber in the 5G system), de-concealment of a privacy-protected subscription identifier (SUCI), access authorization based on subscription data (e.g., roaming restrictions), UE's Serving NF Registration Management (e.g., storing serving AMF for UE, storing serving SMF for UE's PDU Session), service/session continuity (e.g., by keeping SMF/DNN assignment of ongoing sessions., MT-SMS delivery, Lawful Intercept Functionality (especially in outbound roaming cases where a UDM is the only point of contact for LI), subscription management, SMS management, 5GLAN group management handling, and/or external parameter provisioning (Expected UE Behavior parameters or Network Configuration parameters). To provide such functionality, the UDM 810 uses subscription data (including authentication data) that may be stored in a UDR, in which case a UDM implements the application logic and may not require an internal user data storage and several different UDMs may serve the same user in different transactions. The UDM 810 may be located in the HPLMN of the subscribers it serves, and may access the information of the UDR located in the same PLMN.

The AUSF 812 supports authentication for 3GPP access and untrusted non-3GPP access. The AUSF 812 may also provide support for Network Slice-Specific Authentication and Authorization.

The AMF 814 supports termination of RAN CP interface (N2), termination of NAS (N1) for NAS ciphering and integrity protection, registration management, connection management, reachability management, Mobility Management, lawful intercept (for AMF events and interface to LI System), transport for SM messages between UE and SMF, transparent proxy for routing SM messages, Access Authentication, Access Authorization, transport for SMS messages between UE and SMSF, SEAF, Location Services management for regulatory services, transport for Location Services messages between UE and LMF as well as between RAN and LMF, EPS Bearer ID allocation for interworking with EPS, UE mobility event notification, Control Plane CIoT 5GS Optimization, User Plane CIoT 5GS Optimization, provisioning of external parameters (Expected UE Behavior parameters or Network Configuration parameters), and/or Network Slice-Specific Authentication and Authorization. Some or all of the AMF functionalities may be supported in a single instance of the AMF 814. Regardless of the number of Network functions, in certain embodiments there is only one NAS interface instance per access network between the UE and the CN, terminated at one of the Network functions that implements at least NAS security and Mobility Management. The AMF 814 may also include policy related functionalities.

In addition to the functionalities described above, the AMF 814 may include the following functionality to support non-3GPP access networks: support of N2 interface with N3IWF/TNGF, over which some information (e.g., 3GPP Cell Identification) and procedures (e.g., Handover related) defined over 3GPP access may not apply, and non-3GPP access specific information may be applied that do not apply to 3GPP accesses; support of NAS signaling with a UE over N3IWF/TNGF, wherein some procedures supported by NAS signaling over 3GPP access may be not applicable to untrusted non-3GPP (e.g., Paging) access; support of authentication of UEs connected over N3IWF/TNGF; management of mobility, authentication, and separate security context state(s) of a UE connected via a non-3GPP access or connected via a 3GPP access and a non-3GPP access simultaneously; support a coordinated RM management context valid over a 3GPP access and a Non 3GPP access; and/or support dedicated CM management contexts for the UE for connectivity over non-3GPP access. Not all of the above functionalities may be required to be supported in an instance of a Network Slice.

The SMF 816 supports Session Management (e.g., Session Establishment, modify and release, including tunnel maintain between UPF and AN node), UE IP address allocation & management (including optional Authorization) wherein the UE IP address may be received from a UPF or from an external data network, DHCPv4 (server and client) and DHCPv6 (server and client) functions, functionality to respond to Address Resolution Protocol requests and/or IPv6 Neighbor Solicitation requests based on local cache information for the Ethernet PDUs (e.g., the SMF responds to the ARP and/or the IPv6 Neighbor Solicitation Request by providing the MAC address corresponding to the IP address sent in the request), selection and control of User Plane functions including controlling the UPF to proxy ARP or IPv6 Neighbor Discovery or to forward all ARP/IPv6 Neighbor Solicitation traffic to the SMF for Ethernet PDU Sessions, traffic steering configuration at the UPF to route traffic to proper destinations, 5G VN group management (e.g., maintain the topology of the involved PSA UPFs, establish and release the N19 tunnels between PSA UPFs, configure traffic forwarding at UPF to apply local switching, and/or N6-based forwarding or N19-based forwarding), termination of interfaces towards Policy control functions, lawful intercept (for SM events and interface to LI System), charging data collection and support of charging interfaces, control and coordination of charging data collection at the UPF, termination of SM parts of NAS messages, Downlink Data Notification, Initiator of AN specific SM information sent via AMF over N2 to AN, determination of SSC mode of a session, Control Plane CIoT 5GS Optimization, header compression, acting as I-SMF in deployments where I-SMF can be inserted/removed/relocated, provisioning of external parameters (Expected UE Behavior parameters or Network Configuration parameters), P-CSCF discovery for IMS services, roaming functionality (e.g., handle local enforcement to apply QoS SLAB (VPLMN), charging data collection and charging interface (VPLMN), and/or lawful intercept (in VPLMN for SM events and interface to LI System), interaction with external DN for transport of signaling for PDU Session authentication/authorization by external DN, and/or instructing UPF and NG-RAN to perform redundant transmission on N3/N9 interfaces. Some or all of the SMF functionalities may be supported in a single instance of a SMF. However, in certain embodiments, not all of the functionalities are required to be supported in an instance of a Network Slice. In addition to the functionalities, the SMF 816 may include policy related functionalities.

The SCP 818 includes one or more of the following functionalities: Indirect Communication; Delegated Discovery; message forwarding and routing to destination NF/NF services; communication security (e.g., authorization of the NF Service Consumer to access the NF Service Producer's API), load balancing, monitoring, overload control, etc.; and/or optionally interact with the UDR, to resolve the UDM Group ID/UDR Group ID/AUSF Group ID/PCF Group ID/CHF Group ID/HSS Group ID based on UE identity (e.g., SUPI or IMPI/IMPU). Some or all of the SCP functionalities may be supported in a single instance of an SCP. In certain embodiments, the SCP 818 may be deployed in a distributed manner and/or more than one SCP can be present in the communication path between NF Services. SCPs can be deployed at PLMN level, shared-slice level, and slice-specific level. It may be left to operator deployment to ensure that SCPs can communicate with relevant NRFs.

The UE 820 may include a device with radio communication capabilities. For example, the UE 820 may comprise a smartphone (e.g., handheld touchscreen mobile computing devices connectable to one or more cellular networks). The UE 820 may also comprise any mobile or non-mobile computing device, such as Personal Data Assistants (PDAs), pagers, laptop computers, desktop computers, wireless handsets, or any computing device including a wireless communications interface. A UE may also be referred to as a client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. The UE 820 may comprise an IoT UE, which can comprise a network access layer designed for low-power IoT applications utilizing short-lived UE connections. An IoT UE can utilize technologies (e.g., M2M, MTC, or mMTC technology) for exchanging data with an MTC server or device via a PLMN, other UEs using ProSe or D2D communications, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure). The IoT UEs may execute background applications (e.g., keep-alive messages, status updates, etc.) to facilitate the connections of the IoT network.

The UE 820 may be configured to connect or communicatively couple with the (R)AN 822 through a radio interface 830, which may be a physical communication interface or layer configured to operate with cellular communication protocols such as a GSM protocol, a CDMA network protocol, a Push-to-Talk (PTT) protocol, a PTT over Cellular (POC) protocol, a UMTS protocol, a 3GPP LTE protocol, a 5G protocol, a NR protocol, and the like. For example, the UE 820 and the (R)AN 822 may use a Uu interface (e.g., an LTE-Uu interface) to exchange control plane data via a protocol stack comprising a PHY layer, a MAC layer, an RLC layer, a PDCP layer, and an RRC layer. A DL transmission may be from the (R)AN 822 to the UE 820 and a UL transmission may be from the UE 820 to the (R)AN 822. The UE 820 may further use a sidelink to communicate directly with another UE (not shown) for D2D, P2P, and/or ProSe communication. For example, a ProSe interface may comprise one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The (R)AN 822 can include one or more access nodes, which may be referred to as base stations (BSs), NodeBs, evolved NodeBs (eNBs), next Generation NodeBs (gNB), RAN nodes, controllers, transmission reception points (TRPs), and so forth, and can comprise ground stations (e.g., terrestrial access points) or satellite stations providing coverage within a geographic area (e.g., a cell). The (R)AN 822 may include one or more RAN nodes for providing macro-cells, picocells, femtocells, or other types of cells. A macrocell may cover a relatively large geographic area (e.g., several kilometers in radius) and may allow unrestricted access by UEs with service subscription. A picocell may cover a relatively small geographic area and may allow unrestricted access by UEs with service subscription. A femtocell may cover a relatively small geographic area (e.g., a home) and may allow restricted access by UEs having an association with the femtocell (e.g., UEs in a Closed Subscriber Group (CSG), UEs for users in the home, etc.).

Although not shown, multiple RAN nodes (such as the (R)AN 822) may be used, wherein an Xn interface is defined between two or more nodes. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for the UE 820 in a connected mode (e.g., CM-CONNECTED) including functionality to manage the UE mobility for connected mode between one or more (R)AN nodes. The mobility support may include context transfer from an old (source) serving (R)AN node to new (target) serving (R)AN node; and control of user plane tunnels between old (source) serving (R)AN node to new (target) serving (R)AN node.

The UPF 824 may act as an anchor point for intra-RAT and inter-RAT mobility, an external PDU session point of interconnect to the DN 826, and a branching point to support multi-homed PDU session. The UPF 824 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. The UPF 824 may include an uplink classifier to support routing traffic flows to a data network. The DN 826 may represent various network operator services, Internet access, or third party services. The DN 826 may include, for example, an application server.

Figure 9:
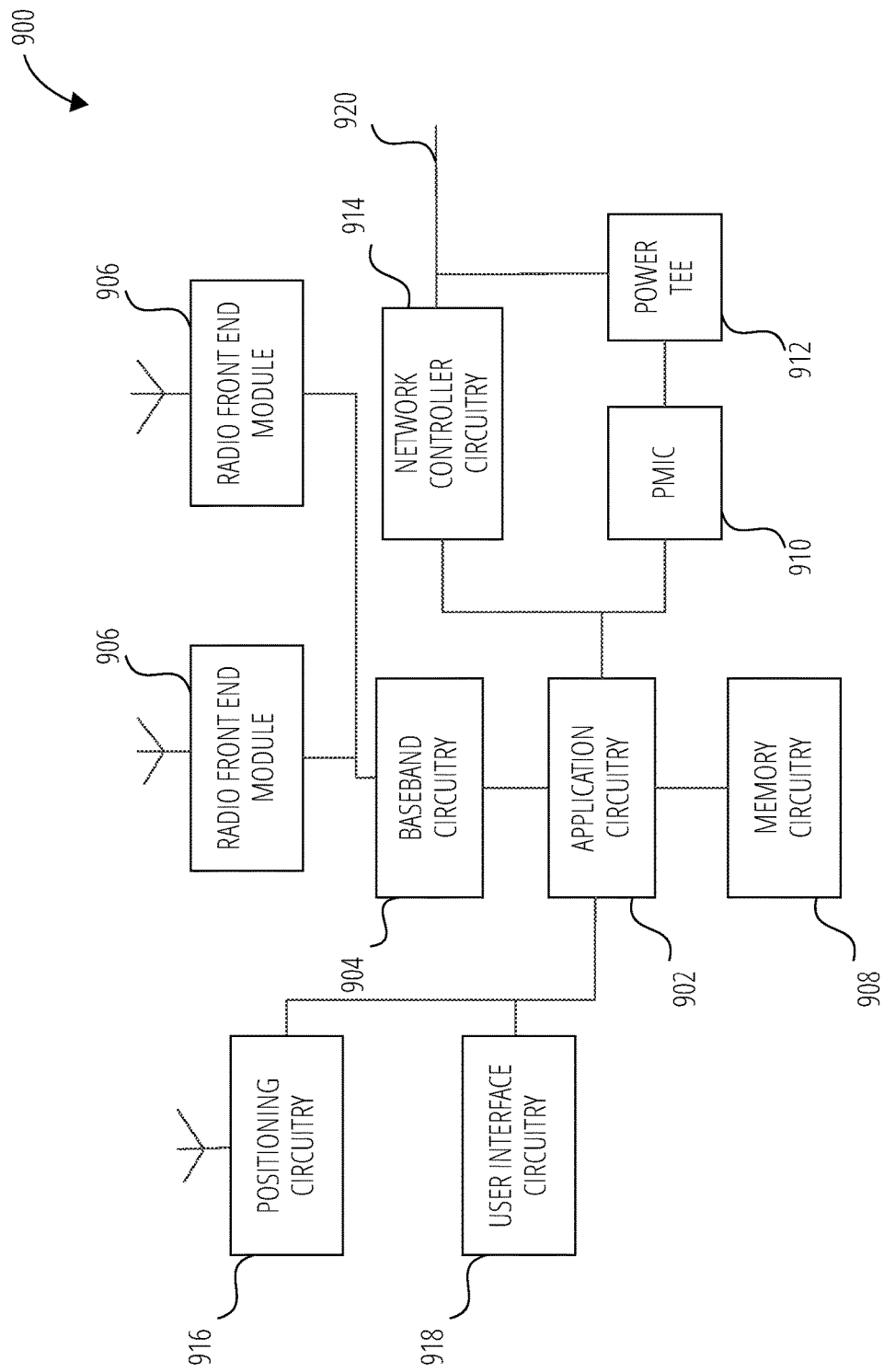
FIG. 9 illustrates an infrastructure equipment in accordance with one embodiment.

FIG. 9 illustrates an example of infrastructure equipment 900 in accordance with various embodiments. The infrastructure equipment 900 may be implemented as a base station, radio head, RAN node, AN, application server, and/or any other element/device discussed herein. In other examples, the infrastructure equipment 900 could be implemented in or by a UE.

The infrastructure equipment 900 includes application circuitry 902, baseband circuitry 904, one or more radio front end module 906 (RFEM), memory circuitry 908, power management integrated circuitry (shown as PMIC 910), power tee circuitry 912, network controller circuitry 914, network interface connector 920, satellite positioning circuitry 916, and user interface circuitry 918. In some embodiments, the device infrastructure equipment 900 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations. Application circuitry 902 includes circuitry such as, but not limited to one or more processors (or processor cores), cache memory, and one or more of low drop-out voltage regulators (LDOs), interrupt controllers, serial interfaces such as SPI, I²C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 902 may be coupled with or may include memory/ storage elements and may be configured to execute instructions stored in the memory/storage to enable various applications or operating systems to run on the infrastructure equipment 900. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 902 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 902 may comprise, or may be, a special-purpose processor/controller to operate according to the various embodiments herein. As examples, the processor(s) of application circuitry 902 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium(™), Inc.; a MIPS-based design from MIPS Technologies, Inc. such as MIPS Warrior P-class processors; and/or the like. In some embodiments, the infrastructure equipment 900 may not utilize application circuitry 902, and instead may include a special-purpose processor/controller to process IP data received from an EPC or 5GC, for example.

In some implementations, the application circuitry 902 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 902 may comprise logic blocks or logic fabric, and other interconnected resources that may be programmed to perform various functions, such as the procedures, methods, functions, etc. of the various embodiments discussed herein. In such embodiments, the circuitry of application circuitry 902 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like. The baseband circuitry 904 may be implemented, for example, as a solder-down substrate including one or more integrated circuits, a single packaged integrated circuit soldered to a main circuit board or a multi-chip module containing two or more integrated circuits.

The user interface circuitry 918 may include one or more user interfaces designed to enable user interaction with the infrastructure equipment 900 or peripheral component interfaces designed to enable peripheral component interaction with the infrastructure equipment 900. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end module 906 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 906, which incorporates both mmWave antennas and sub-mmWave.

The memory circuitry 908 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory(MRAM), etc., and may incorporate the three-dimensional (3D)cross-point (XPOINT) memories from Intel® and Micron®. The memory circuitry 908 may be implemented as one or more of solder down packaged integrated circuits, socketed memory modules and plug-in memory cards.

The PMIC 910 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 912 may provide for electrical power drawn from a network cable to provide both power supply and data connectivity to the infrastructure equipment 900 using a single cable.

The network controller circuitry 914 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 900 via network interface connector 920 using a physical connection, which may be electrical (commonly referred to as a "copper interconnect"), optical, or wireless. The network controller circuitry 914 may include one or more dedicated processors and/or FPGAs to communicate using one or more of the aforementioned protocols. In some implementations, the network controller circuitry 914 may include multiple controllers to provide connectivity to other networks using the same or different protocols.

The positioning circuitry 916 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo System, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS),etc.), or the like. The positioning circuitry 916 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 916 may include a Micro-Technology for Positioning, Navigation, and Timing (Micro-PNT) IC that uses a master timing clock to perform position tracking/estimation without GNSS assistance. The positioning circuitry 916 may also be part of, or interact with, the baseband circuitry 904 and/or radio front end module 906 to communicate with the nodes and components of the positioning network. The positioning circuitry 916 may also provide position data and/or time data to the application circuitry 902, which may use the data to synchronize operations with various infrastructure, or the like. The components shown by FIG. 9 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCix), PCI express (PCie), or any number of other technologies. The bus/IX may be a proprietary bus, for example, used in a SoC based system. Other bus/IX systems may be included, such as an I²C interface, an SPI interface, point to point interfaces, and a power bus, among others.

Figure 10:
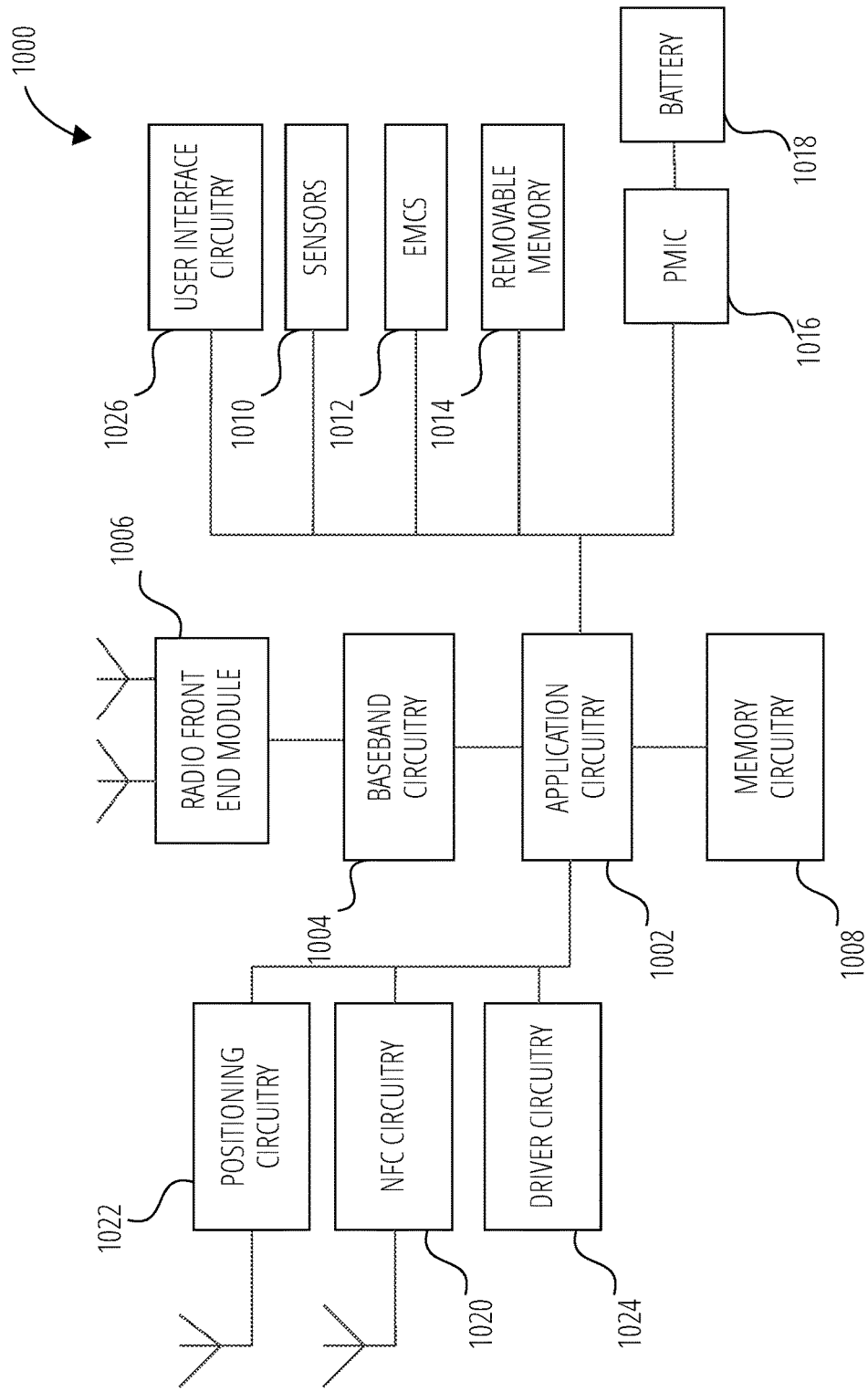
FIG. 10 illustrates a platform in accordance with one embodiment.

FIG. 10 illustrates an example of a platform 1000 in accordance with various embodiments. In embodiments, the computer platform 1000 may be suitable for use as UEs, application servers, and/or any other element/device discussed herein. The platform 1000 may include any combinations of the components shown in the example. The components of platform 1000 may be implemented as integrated circuits (ICs), portions thereof, discrete electronic devices, or other modules, logic, hardware, software, firmware, or a combination thereof adapted in the computer platform 1000, or as components otherwise incorporated within a chassis of a larger system. The block diagram of FIG. 10 is intended to show a high level view of components of the computer platform 1000. However, some of the components shown may be omitted, additional components may be present, and different arrangement of the components shown may occur in other implementations.

Application circuitry 1002 includes circuitry such as, but not limited to one or more processors (or processor cores), cache memory, and one or more of LDOs, interrupt controllers, serial interfaces such as SPI, I²C or universal programmable serial interface module, RTC, timer-counters including interval and watchdog timers, general purpose IO, memory card controllers such as SD MMC or similar, USB interfaces, MIPI interfaces, and JTAG test access ports. The processors (or cores) of the application circuitry 1002 may be coupled with or may include memory/storage elements and may be configured to execute instructions stored in the memory/storage to enable various applications or operating systems to run on the platform 1000. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1002 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 1002 may comprise, or may be, a special-purpose processor/controller to operate according to the various embodiments herein.

As examples, the processor(s) of application circuitry 1002 may include an Intel® Architecture Core™ based processor, such as a Quark™, an Atom™, an i3, an i5, an i7, or an MCU-class processor, or another such processor available from Intel® Corporation. The processors of the application circuitry 1002 may also be one or more of Advanced Micro Devices (AMD) Ryzen® processor(s) or Accelerated Processing Units (APUs); AS-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 1002 may be a part of a system on a chip (SoC) in which the application circuitry 1002 and other components are formed into a single integrated circuit, or a single package, such as the Edison™ or Galileo™ SoC boards from Intel® Corporation.

Additionally or alternatively, application circuitry 1002 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 1002 may comprise logic blocks or logic fabric, and other interconnected resources that may be programmed to perform various functions, such as the procedures, methods, functions, etc. of the various embodiments discussed herein. In such embodiments, the circuitry of application circuitry 1002 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 1004 may be implemented, for example, as a solder-down substrate including one or more integrated circuits, a single packaged integrated circuit soldered to a main circuit board or a multi-chip module containing two or more integrated circuits.

The radio front end module 1006 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 1006, which incorporates both mmWave antennas and sub-mmWave.

The memory circuitry 1008 may include any number and type of memory devices used to provide for a given amount of system memory. As examples, the memory circuitry 1008 may include one or more of volatile memory including random access memory (RAM), dynamic RAM (DRAM) and/or synchronous dynamic RAM (SD RAM), and non-volatile memory (NVM) including high-speed electrically erasable memory (commonly referred to as Flash memory), phase change random access memory (PRAM), magnetoresistive random access memory (MRAM), etc. The memory circuitry 1008 may be developed in accordance with a Joint Electron Devices Engineering Council (JEDEC) low power double data rate (LPDDR)-based design, such as LPDDR2, LPDDR3, LPDDR4, or the like. Memory circuitry 1008 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 1008 maybe on-die memory or registers associated with the application circuitry 1002. To provide for persistent storage of information such as data, applications, operating systems and so forth, memory circuitry 1008 may include one or more mass storage devices, which may include, inter alia, a solid state disk drive (SSDD), hard disk drive(HDD), a microHDD, resistance change memories, phase change memories, holographic memories, or chemical memories, among others. For example, the computer platform 1000 may incorporate the three-dimensional (3D) cross-point (XPOINT) memories from Intel® and Micron®.

The removable memory 1014 may include devices, circuitry, enclosures/housings, ports or receptacles, etc. used to couple portable data storage devices with the platform 1000. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 1000 may also include interface circuitry (not shown) that is used to connect external devices with the platform 1000. The external devices connected to the platform 1000 via the interface circuitry include sensors 1010 and electro-mechanical components (shown as EMCs 1012), as well as removable memory devices coupled to removable memory 1014.

The sensors 1010 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 1012 include devices, modules, or subsystems whose purpose is to enable platform 1000 to change its state, position, and/or orientation, or move or control a mechanism or (sub)system. Additionally, EMCs 1012 may be configured to generate and send messages/signaling to other components of the platform 1000 to indicate a current state of the EMCs 1012. Examples of the EMCs 1012 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 1000 is configured to operate one or more EMCs 1012 based on one or more captured events and/or instructions or control signals received from a service provider and/or various clients. In some implementations, the interface circuitry may connect the platform 1000 with positioning circuitry 1022. The positioning circuitry 1022 includes circuitry to receive and decode signals transmitted/broadcasted by a positioning network of a GNSS. Examples of navigation satellite constellations (or GNSS)include United States' GPS, Russia's GLONASS, the European Union's Galileo system, China's BeiDou Navigation Satellite System, a regional navigation system or GNSS augmentation system(e.g., NAVIC), Japan's QZSS, France's DORIS, etc.), or the like. The positioning circuitry 1022 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1022 may include a Micro-PNT IC that uses a master timing clock to perform position tracking/estimation without GNSS assistance. The positioning circuitry 1022 may also be part of, or interact with, the baseband circuitry 1004 and/or radio front end module 1006 to communicate with the nodes and components of the positioning network. The positioning circuitry 1022 may also provide position data and/or time data to the application circuitry 1002, which may use the data to synchronize operations with various infrastructure (e.g., radio base stations), for turn-by-turn navigation applications, or the like.

In some implementations, the interface circuitry may connect the platform 1000 with Near-Field Communication circuitry (shown as NFC circuitry 1020). The NFC circuitry 1020 is configured to provide contactless, short-range communications based on radio frequency identification (RFID) standards, wherein magnetic field induction is used to enable communication between NFC circuitry 1020 and NFC-enabled devices external to the platform 1000 (e.g., an "NFC touchpoint"). NFC circuitry 1020 comprises an NFC controller coupled with an antenna element and a processor coupled with the NFC controller. The NFC controller may be a chip/IC providing NFC functionalities to the NFC circuitry 1020 by executing NFC controller firmware and an NFC stack The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 1020, or initiate data transfer between the NFC circuitry 1020 and another active NFC device (e.g., a smartphone or an NFC-enabled POS terminal) that is proximate to the platform 1000.

The driver circuitry 1024 may include software and hardware elements that operate to control particular devices that are embedded in the platform 1000, attached to the platform 1000, or otherwise communicatively coupled with the platform 1000. The driver circuitry 1024 may include individual drivers allowing other components of the platform 1000 to interact with or control various input/output (I/O) devices that may be present within, or connected to, the platform 1000. For example, driver circuitry 1024 may include a display driver to control and allow access to a display device, a touchscreen driver to control and allow access to a touchscreen interface of the platform 1000, sensor drivers to obtain sensor readings of sensors 1010 and control and allow access to sensors 1010, EMC drivers to obtain actuator positions of the EMCs 1012 and/or control and allow access to the EMCs 1012, a camera driver to control and allow access to an embedded image capture device, audio drivers to control and allow access to one or more audio devices.

The power management integrated circuitry (shown as PMIC 1016) (also referred to as "power management circuitry") may manage power provided to various components of the platform 1000. In particular, with respect to the baseband circuitry 1004, the PMIC 1016 may control power-source selection, voltage scaling, battery charging, or DC-to-DC conversion. The PMIC 1016 may often be included when the platform 1000 is capable of being powered by a battery 1018, for example, when the device is included in a UE.

In some embodiments, the PMIC 1016 may control, or otherwise be part of, various power saving mechanisms of the platform 1000. For example, if the platform 1000 is in an RRC_Connected state, where it is still connected to the RAN node as it expects to receive traffic shortly, then it may enter a state known as Discontinuous Reception Mode (DRX) after a period of inactivity. During this state, the platform 1000 may power down for brief intervals of time and thus save power. If there is no data traffic activity for an extended period of time, then the platform 1000 may transition off to an RRC_Idle state, where it disconnects from the network and does not perform operations such as channel quality feedback, handover, etc. The platform 1000 goes into a very low power state and it performs paging where again it periodically wakes up to listen to the network and then powers down again. The platform 1000 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1018 may power the platform 1000, although in some examples the platform 1000 may be mounted deployed in a fixed location, and may have a power supply coupled to an electrical grid. The battery 1018 may be a lithium ion battery, a metal-air battery, such as a zinc-air battery, an aluminum-air battery, a lithium-air battery, and the like. In some implementations, such as in V2X applications, the battery 1018 may be a typical lead-acid automotive battery.

In some implementations, the battery 1018 may be a "smart battery," which includes or is coupled with a Battery Management System (BMS) or battery monitoring integrated circuitry. The BMS may be included in the platform 1000 to track the state of charge (SoCh) of the battery 1018. The BMS may be used to monitor other parameters of the battery 1018 to provide failure predictions, such as the state of health (SoH) and the state of function (SoF) of the battery 1018. The BMS may communicate the information of the battery 1018 to the application circuitry 1002 or other components of the platform 1000. The BMS may also include an analog-to-digital (ADC) convertor that allows the application circuitry 1002 to directly monitor the voltage of the battery 1018 or the current flow from the battery 1018. The battery parameters may be used to determine actions that the platform 1000 may perform, such as transmission frequency, network operation, sensing frequency, and the like.

A power block, or other power supply coupled to an electrical grid may be coupled with the BMS to charge the battery 1018. In some examples, the power block may be replaced with a wireless power receiver to obtain the power wirelessly, for example, through a loop antenna in the computer platform 1000. In these examples, a wireless battery charging circuit may be included in the BMS. The specific charging circuits chosen may depend on the size of the battery 1018, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 1026 includes various input/output (I/O) devices present within, or connected to, the platform 1000, and includes one or more user interfaces designed to enable user interaction with the platform 1000 and/or peripheral component interfaces designed to enable peripheral component interaction with the platform 1000. The user interface circuitry 1026 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators such as binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 1000. The output device circuitry may also include speakers or other audio emitting devices, printer(s), and/or the like. In some embodiments, the sensors 1010 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 1000 may communicate with one another using a suitable bus or interconnect (IX) technology, which may include any number of technologies, including ISA, EISA, PCI, PCix, PCie, a Time-Trigger Protocol (TTP) system, a FlexRay system, or any number of other technologies. The bus/IX may be a proprietary bus/IX, for example, used in a SoC based system. Other bus/IX systems may be included, such as an I²C interface, an SPI interface, point-to-point interfaces, and a power bus, among others.

Figure 11:
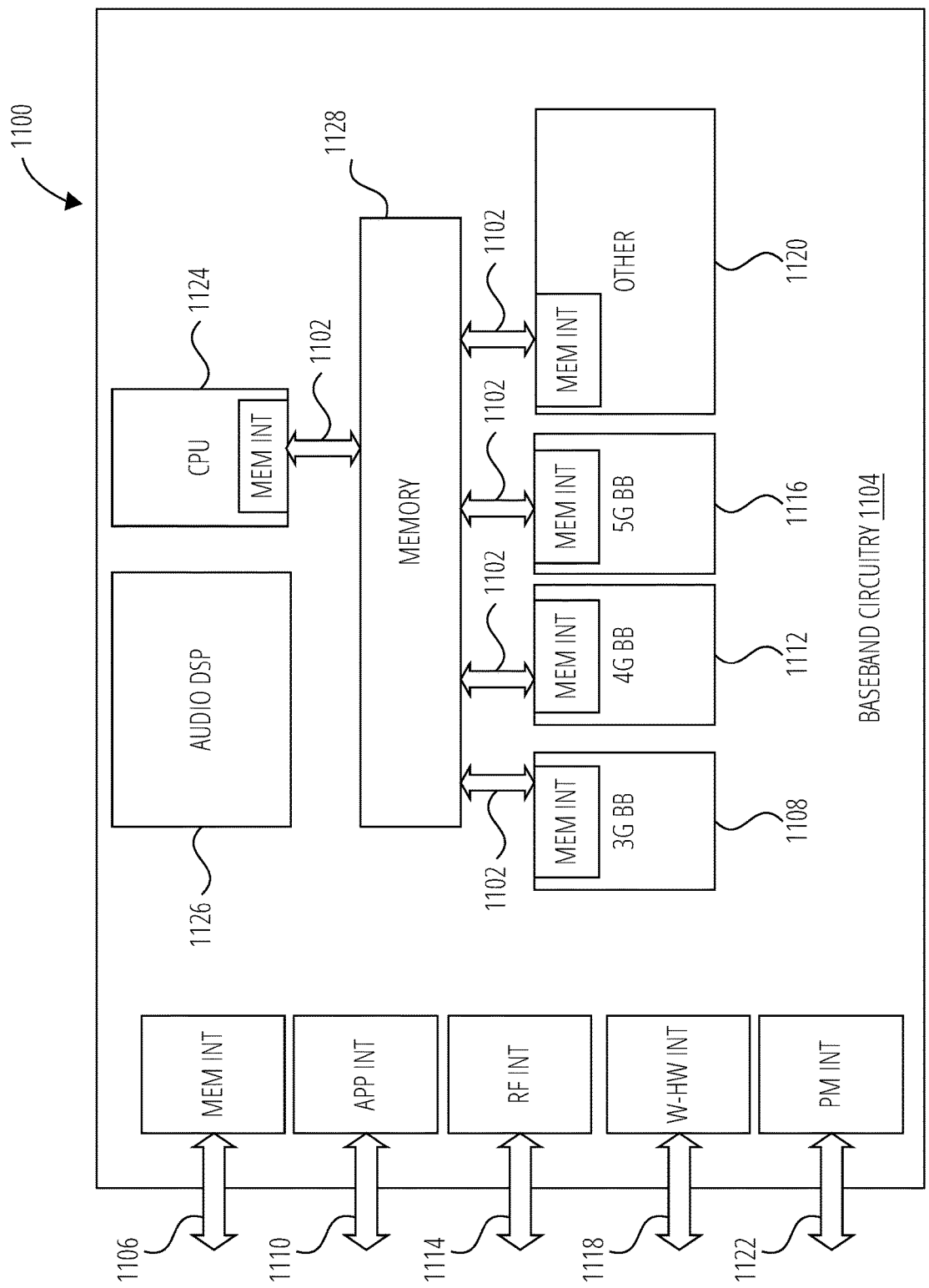
FIG. 11 illustrates example interfaces in accordance with one embodiment.

FIG. 11 illustrates example interfaces 1100 of baseband circuitry 1104 in accordance with some embodiments. The baseband circuitry 1104 may comprise 3G baseband processor 1108, 4G baseband processor 1112, 5G baseband processor 1116, other baseband processor(s) 1120, CPU 1124, one or more audio DSP(s) 1126, and a memory 1128 utilized by said processors. As illustrated, each of the processors may include a respective memory interface 1102 to send/receive data to/from the memory 1128.

The baseband circuitry 1104 may further include one or more interfaces to communicatively couple to other circuitries/devices, such as a memory interface 1106 (e.g., an interface to send/receive data to/from memory external to the baseband circuitry 1104), an application circuitry interface 1110, an RF circuitry interface 1114, a wireless hardware connectivity interface 1118 (e.g., an interface to send/receive data to/from Near Field Communication (NFC) components, Bluetooth® components (e.g., Bluetooth® Low Energy), WiFi® components, and other communication components), and a power management interface 1122.

Figure 12:
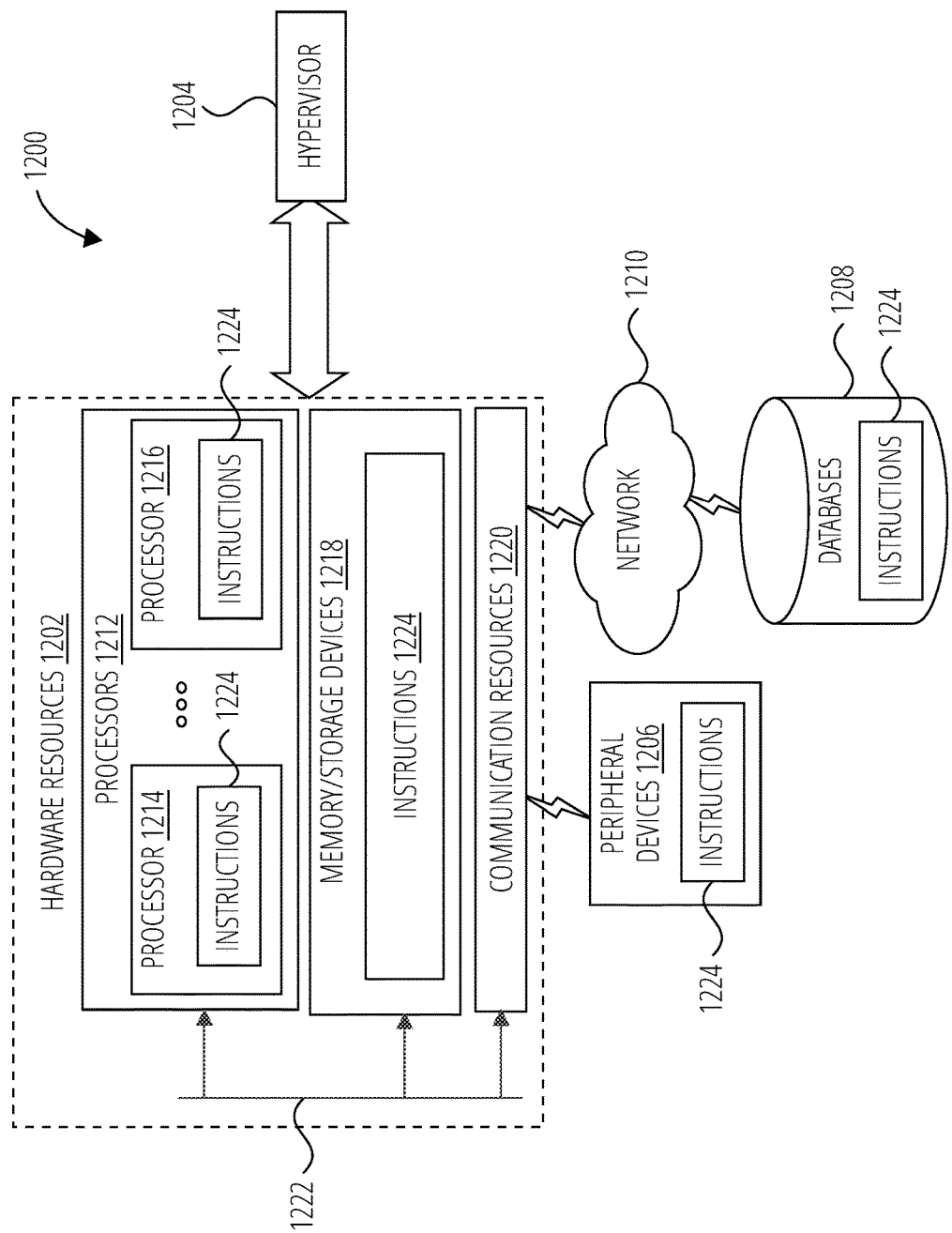
FIG. 12 illustrates components in accordance with one embodiment.

FIG. 12 is a block diagram illustrating components 1200, according to some example embodiments, able to read instructions from a machine-readable or computer-readable medium (e.g., a non-transitory machine-readable storage medium) and perform any one or more of the methodologies discussed herein. Specifically, FIG. 12 shows a diagrammatic representation of hardware resources 1202 including one or more processors 1212 (or processor cores), one or more memory/storage devices 1218, and one or more communication resources 1220, each of which may be communicatively coupled via a bus 1222. For embodiments where node virtualization (e.g., NFV) is utilized, a hypervisor 1204 may be executed to provide an execution environment for one or more network slices/sub-slices to utilize the hardware resources 1202.

The processors 1212 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1214 and a processor 1216.

The memory/storage devices 1218 may include main memory, disk storage, or any suitable combination thereof. The memory/storage devices 1218 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1220 may include interconnection or network interface components or other suitable devices to communicate with one or more peripheral devices 1206 or one or more databases 1208 via a network 1210. For example, the communication resources 1220 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1224 may comprise software, a program, an application, an applet, an app, or other executable code for causing at least any of the processors 1212 to perform any one or more of the methodologies discussed herein. The instructions 1224 may reside, completely or partially, within at least one of the processors 1212 (e.g., within the processor's cache memory), the memory/storage devices 1218, or any suitable combination thereof. Furthermore, any portion of the instructions 1224 may be transferred to the hardware resources 1202 from any combination of the peripheral devices 1206 or the databases 1208. Accordingly, the memory of the processors 1212, the memory/storage devices 1218, the peripheral devices 1206, and the databases 1208 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Example Section

The following examples pertain to further embodiments.

Example 1 may include an apparatus comprising means to perform one or more elements of a method described in or related to any of the above embodiments, or any other method or process described herein.

Example 2 may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 3 may include an apparatus comprising logic, modules, or circuitry to perform one or more elements of a method described in or related to any of the above Examples, or any other method or process described herein.

Example 4 may include a method, technique, or process as described in or related to any of the above Examples, or portions or parts thereof Example 5 may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 6 may include a signal as described in or related to any of the above Examples, or portions or parts thereof.

Example 7 may include a datagram, packet, frame, segment, protocol data unit (PDU), or message as described in or related to any of the above Examples, or portions or parts thereof, or otherwise described in the present disclosure.

Example 8 may include a signal encoded with data as described in or related to any of the above Examples, or portions or parts thereof, or otherwise described in the present disclosure.

Example 9 may include a signal encoded with a datagram, packet, frame, segment, PDU, or message as described in or related to any of the above Examples, or portions or parts thereof, or otherwise described in the present disclosure.

Example 10 may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 11 may include a computer program comprising instructions, wherein execution of the program by a processing element is to cause the processing element to carry out the method, techniques, or process as described in or related to any of the above Examples, or portions thereof.

Example 12 may include a signal in a wireless network as shown and described herein.

Example 13 may include a method of communicating in a wireless network as shown and described herein.

Example 14 may include a system for providing wireless communication as shown and described herein.

Example 15 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for a user equipment (UE), the method comprising:
receiving, at the UE, a message indicating at least one public land mobile network (PLMN) that provides emergency services support for devices in at least one of a limited service state and a roaming state;

storing, in a non-volatile memory (NVM), an identifier of the at least one PLMN in a whitelist of emergency services support for devices in at least one of the limited service state and the roaming state, wherein storing the identifier in the NVM comprises updating an elementary file (EF) in a subscriber identity module (SIM) card to indicate a preferred PLMN for emergency sessions that is prioritized based on one or more parameters selected from a group comprising support for emergency text messages, support for emergency callback, and support for emergency session over a particular radio access technology (RAT) type; and in response to a trigger to initiate an emergency session for the UE in at least one of the limited service state and the roaming state, establishing the emergency session with a selected PLMN based on the whitelist.

2. The method of claim 1, wherein storing the identifier in the NVM further comprises updating the EF in the SIM card to indicate that the at least one PLMN corresponding to a mobile country code (MCC) supports at least one of emergency calls for devices in limited service with no valid SIM, emergency calls for roaming devices with a roaming agreement and in normal service, emergency calls for roaming devices with a valid SIM but without the roaming agreement, and emergency text for roaming devices with the roaming agreement and in normal service.

3. The method of claim 1, wherein the message comprises a system information block (SIB) broadcast from a serving cell.

4. The method of claim 3, wherein the SIB indicates whether at least one of the serving cell and a neighbor cell supports at least one of emergency calls for devices in limited service with no valid SIM, emergency calls for roaming devices with a roaming agreement and in normal service, emergency calls for roaming devices with a valid SIM but without the roaming agreement, and emergency text for roaming devices with the roaming agreement and in normal service, wherein the serving cell corresponds to a first PLMN and the neighbor cell corresponds to the first or a second PLMN.

5. The method of claim 3, wherein for each of a plurality of PLMN identifiers listed in a PLMN identity list indicated in the SIB, determining whether support is provided for at least one of emergency calling in limited service, emergency calling for roaming users, and emergency text sessions.

6. The method of claim 3, wherein the SIB comprises a first SIB (SIB1) including an information element (IE) configured to indicate whether a roaming emergency policy is allowed or disallowed.

7. The method of claim 3, wherein the SIB comprises a second SIB (SIB2) including an information element (IE) indicating a roaming emergency barring policy.

8. The method of claim 1, wherein the message comprises a list of roaming partners that provide support for at least one of emergency calls for devices in limited service with no valid SIM, emergency calls for roaming devices with a roaming agreement and in normal service, emergency calls for roaming devices with a valid SIM but without the roaming agreement, and emergency text for roaming devices with the roaming agreement and in normal service.

9. The method of claim 8, further comprising receiving the message comprising the list of roaming partners from a wireless network in a configuration update command.

10. The method of claim 8, further comprising:
sending a registration request to a home public land mobile network (HPLMN), the registration request indicating one or more countries or regions for which the UE requests the list of roaming partners; and
in response to the registration request, receiving a registration accept message from the HPLMN comprising the list of roaming partners.

11. The method of claim 1, wherein the message comprises a secured container from a home public land mobile network (HPLMN) forwarded by a visited public land mobile network (VPLMN) in a registration accept message or a registration reject message.

12. The method of claim 11, wherein the message comprises a list of VPLMNs that provide support for at least one of emergency calls for devices in limited service with no valid SIM, emergency calls for roaming devices with a roaming agreement and in normal service, emergency calls for roaming devices with a valid SIM but without the roaming agreement, and emergency text for roaming devices with the roaming agreement and in normal service.

13. The method of claim 1, wherein the message is received from an entitlement server or application server.

14. The method of claim 1, wherein the message comprises a table indicating success rates of a plurality of roaming UEs that attempted emergency services per visited public land mobile network (VPLMN).

15. The method of claim 14, wherein the table includes additional information selected from a group comprising a relation between home public land mobile networks (HPLMNs) and VPLMNs, a prioritized list of RAT types, and success rates based on attempts made by UEs with or without SIM cards.

16. The method of claim 1, wherein the message is received from a base station of a home public land mobile network (HPLMN) when the UE is in a non-roaming scenario.

17. The method of claim 1, wherein the message is received from an access point of a wireless local area network (WLAN) when the UE is in a roaming scenario.

18. A network element in a wireless communication system, the network element comprising:
memory to store data to identify at least one public land mobile network (PLMN) that provides emergency services support for devices in limited service; and
one or more processors to generate a message to send to a user equipment (UE), the message comprising the data to identify the at least one PLMN that provides emergency services support for devices in at least one of a limited service state and a roaming state, wherein the data indicates a preferred PLMN for emergency sessions, and wherein the preferred PLMN for emergency sessions is prioritized based on one or more parameters selected from a group comprising support for emergency text messages, support for emergency callback, and support for emergency session over a particular radio access technology (RAT) type.

* * * * *